US012711270B1

(12) United States Patent
Ross et al.

(10) Patent No.: US 12,711,270 B1
(45) Date of Patent: Aug. 18, 2026

(54) ALLOWING PROGRAMMATIC ACCESS TO CUSTOMER DATA IN A PRIVACY-PRESERVING MANNER

(71) Applicant: Splunk Inc., San Franciscso, CA (US)

(72) Inventors: Alan D. Ross, Hingham, MA (US); Vadan Thimmegowda, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 130 days.

(21) Appl. No.: 18/429,024

(22) Filed: Jan. 31, 2024

Related U.S. Application Data

(60) Provisional application No. 63/482,542, filed on Jan. 31, 2023.

(51) Int. Cl.
*G06F 21/60* (2013.01)
*G06F 21/62* (2013.01)

(52) U.S. Cl.
CPC ........ *G06F 21/6254* (2013.01); *G06F 21/604* (2013.01); *G06F 2221/2111* (2013.01); *G06F 2221/2141* (2013.01)

(58) Field of Classification Search
CPC ............... G06F 21/6254; G06F 21/604; G06F 2221/2111; G06F 2221/2141
See application file for complete search history.

(56) References Cited

U.S. PATENT DOCUMENTS 7,937,344 B2 5/2011 Baum et al.
8,112,425 B2 2/2012 Baum et al.
8,751,529 B2 6/2014 Zhang et al.
8,788,525 B2 7/2014 Neels et al.
9,215,240 B2 12/2015 Merza et al.
9,286,413 B1 3/2016 Coates et al.
10,127,258 B2 11/2018 Lamas et al.
10,291,543 B1 * 5/2019 Felstaine ................ H04L 41/40
11,520,928 B2 * 12/2022 Brannon ............. G06F 21/6245
2014/0310679 A1 * 10/2014 Bhattacharya ........ G06F 11/362 717/102
2018/0276414 A1 * 9/2018 Beckman ................ H04L 67/10
2019/0098106 A1 3/2019 Mungel et al.
2020/0042837 A1 * 2/2020 Skinner ................. H04L 63/102
2020/0242138 A1 * 7/2020 Russ ................... G06F 16/2455
2021/0271586 A1 * 9/2021 Emek .................. G06F 11/3684
2021/0281548 A1 * 9/2021 Ackerly .................. H04L 67/60
2021/0306338 A1 * 9/2021 Miriyala ............... H04L 63/101
(Continued)

OTHER PUBLICATIONS

Splunk Enterprise 8.0.0 Overview, available online, retrieved May 20, 2020 from docs.splunk.com, 17 pages.
(Continued)

*Primary Examiner* — Andrew Suh

(74) *Attorney, Agent, or Firm* — Rutan & Tucker, LLP; Kyle M. St. James

(57) ABSTRACT

A method comprises obtaining personal identifiable information (PII) acquired by a production environment of a software application. The method further comprises transforming the PII to produce de-identified data corresponding to the PII, and enabling access to the de-identified data corresponding to the PII by a development environment of the software application while preventing access to the PII by the development environment of the software application.

17 Claims, 15 Drawing Sheets

(56) References Cited

U.S. PATENT DOCUMENTS

| | | | | |
|---|---|---|---|---|
| 2022/0114281 | A1* | 4/2022 | Llamas Virgen | G06N 5/01 |
| 2022/0269820 | A1* | 8/2022 | Singh Bawa | G06F 18/214 |
| 2023/0185934 | A1* | 6/2023 | Seilnacht | G06F 21/602 726/27 |
| 2023/0269291 | A1* | 8/2023 | Ramadas | G10L 15/30 709/201 |
| 2023/0418970 | A1* | 12/2023 | Dobrin | G06F 21/6245 |
| 2024/0143829 | A1* | 5/2024 | Fleck | G06F 21/6245 |

OTHER PUBLICATIONS

Splunk Cloud 8.0.2004 User Manual, available online, retrieved May 20, 2020 from docs.splunk.com, 66 pages.

Splunk Quick Reference Guide, updated 2019, available online at https://www.splunk.com/pdfs/solution-guides/splunk-quick-reference-guide.pdf, retrieved May 20, 2020, 6 pages.

Carraso, David, "Exploring Splunk," published by CITO Research, New York, NY, Apr. 2012, 156 pages.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010, 9 pages.

* cited by examiner

ALLOWING PROGRAMMATIC ACCESS TO CUSTOMER DATA IN A PRIVACY-PRESERVING MANNER

This application claims the benefit of U.S. provisional patent application No. 63/482,542, filed on Jan. 31, 2023, which is incorporated by reference herein in its entirety.

BACKGROUND

Information technology (IT) environments can include diverse types of data systems that acquire and store large amounts of diverse data types generated by numerous devices. For example, a big data ecosystem may include databases such as MySQL and Oracle databases, cloud computing services such as Amazon web services (AWS), and/or other data systems that store passively- or actively-generated data. The acquired and stored data can include, among other things, personally identifiable information (PII), machine-generated data ("machine data") and/or other types of data.

The number and diversity of data systems containing massive amounts of structured, semi-structured, and unstructured data relevant to any search query is very large, and continues to grow rapidly. This technological evolution can give rise to various challenges in relation to managing, understanding and effectively utilizing the data.

BRIEF DESCRIPTION OF THE DRAWINGS

Illustrative examples are described in detail below with reference to the following figures.

DETAILED DESCRIPTION

Figure 1A:
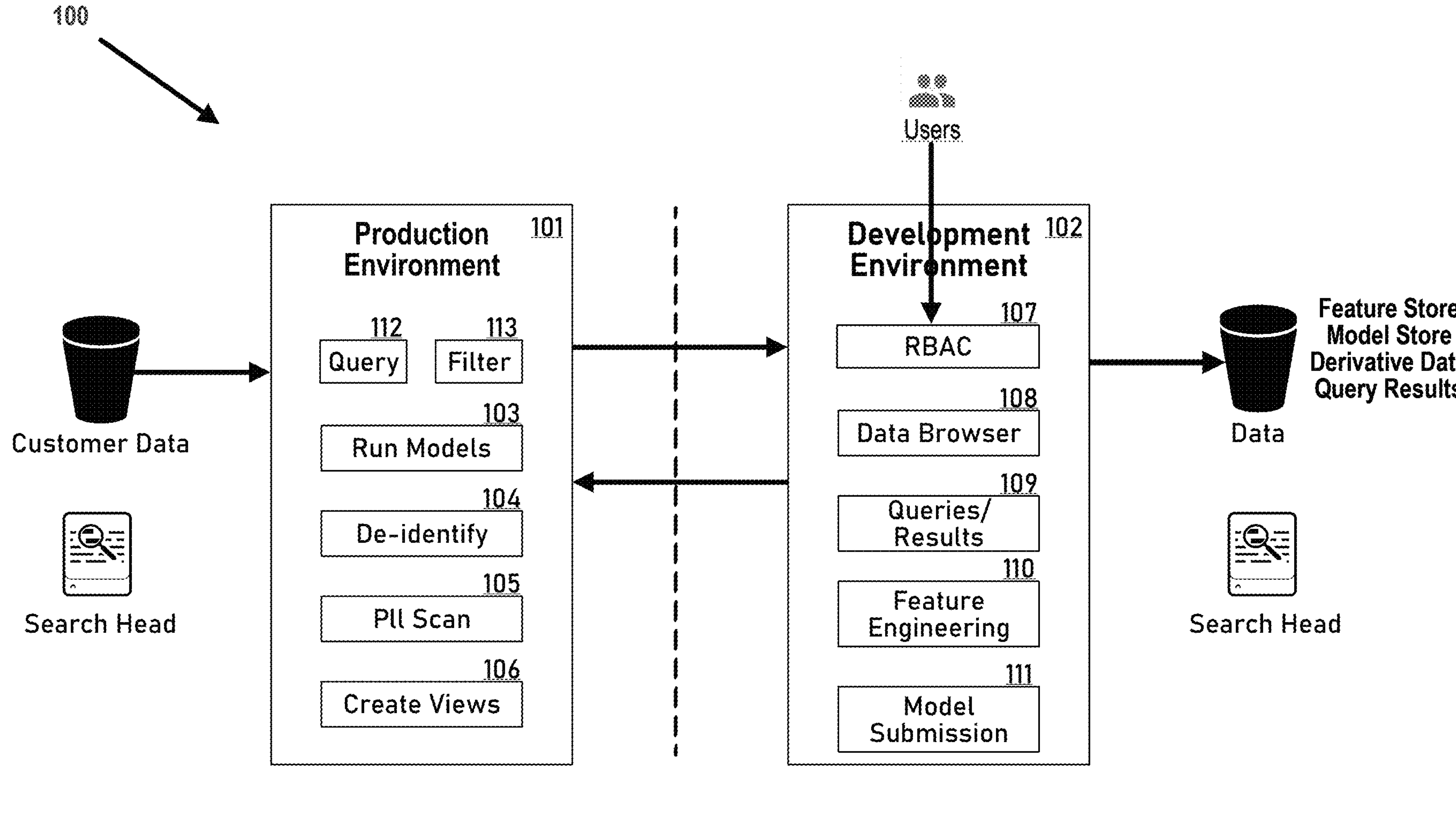
FIG. 1A shows an embodiment of a system that provides a managed, segregated access methodology by which analytics developers and data scientists can access to customer data without risking the associated PII or other sensitive elements of customer data.

A vendor of a software application, such as a cybersecurity application for example, may license the software application to multiple customers, each of whom runs the software application. Copies of the software application used by customers may be hosted on customer premises equipment (in the case of a so-called "on prem" version of the application) or they may be hosted "in the cloud." In this description, the combined computer hardware and software in which a customer's licensed copy of the application runs (whether on-prem or in the cloud) is called a "production environment" or "runtime environment." Additionally, a software vendor may maintain one or more "development environments," which are the combined computer hardware and software in which one or more versions of the software application are run and/or edited by software developers (e.g., employees of the vendor) for purposes of development and testing of the software application. Customers do not have access to the development environment, and typically software developers do not have access to the production environment, or the data generated and collected by the production environment.

The diverse data acquired and used in an organization often cater to different use cases and needs. Many organizations could derive significant value from running analytics on real collected data from production environments of their software. Further, with the increasing demand for use of artificial intelligence (AI), there are benefits to using the data produced by different data sources to train machine learning models. A complication arises, however, when the data to be used for these purposes contains large amounts of PII. Data analytics and training of machine learning models needs to be done without violating applicable laws, regulations or corporate policies regarding the use and disclosure of PII.

Because of such laws, regulations and corporate policies, machine learning software developers may have no access to the most valuable data to test and train new models (i.e., actual customer data), and may have no method to understand the efficacy of their analytics and/or security content. Instead, software developers may need to rely on contrived test data (i.e., fake data) for these purposes. Further, customers of software vendors may struggle with noise, false positives and lack of understanding of the important features and elements of their data. Research engineers may need to create multiple versions of datasets and experiment with different model architectures, which effectively forces a design to store and use the data without duplicating it.

The solution introduced here, therefore, includes a technique for de-identifying (anonymizing) PII in data acquired by an organization. The technique enables software developers to use the de-identified (anonymized) data for (among other things) training machine learning models, developing or tuning analytics and/or for other developmental purposes, without comprising the PII, and without requiring creation of duplicate data sets. The term "de-identified data," as used herein, means data that contained PII but that has been processed to remove some or all of its PII and/or to replace some or all of its PII with non-user-specific data ("non-PII").

In at least some embodiments, the technique introduced here, PII associated with one or more people is acquired by a production environment of a software application. The software application can be, for example, a cybersecurity application, although it could be essentially any other kind of software that acquires or generates PII. The technique introduced here comprises transforming the PII to produce de-identified data corresponding to the PII, and enabling access to the de-identified data by a development environment of the software application (and therefore, by users of the development environment), while preventing access to the PII by the development environment (and therefore, by users of the development environment). Additional features and aspects of the technique are described below.

FIG. 1A shows a system 100 that provides a managed, segregated access methodology by which analytics developers and data scientists can access to customer data without risking the associated PII or other sensitive elements of customer data. More specifically, the system 100 includes two security zones, namely, a production environment 101 of a software application and a development environment 102 of the software application. It may be assumed that the development environment 102 is operated by a vendor of the software application, while the production environment 101 is operated by a customer of the vendor. The software application can be a cybersecurity application, for example.

The production environment 101 contains customer data. The development environment does not contain customer data but includes features, machine learning models (hereinafter simply "models"), output and derivative data used by data scientists and model developers in a cloud development environment.

The query engine 112 in the production environment 101 processes queries and outputs corresponding results. The query engine 112 handles all the queries coming from users of the software application in the production environment 101. A response to a query may be raw data stored in the production environment 101 without any de-identification. The production environment 102 also includes a filter module 113 to filter query results according to user-provided and/or system-provided criteria.

The production environment 101 also includes run models 103, which are production machine learning models. The run models 103 are executed on top of the raw data in the production environment 101.

The production environment 101 also includes a de-identification engine 104, which de-identifies PII and sends the de-identified data to the development environment 102, for use by developers in developing models using customer data. The de-identification engine 104 acts on any request coming from the development environment 102 either from the data browser 108, Queries/Result component 109 or feature engineering module 110.

The production environment 101 also includes a PII scan module 105 monitors for any leaked PII data in the customer data after the customer data has been de-identified. This functionality provides additional validation before the de-identified data is shared with the development environment 102.

The production environment 101 also includes a Create Views module 106. This module receives any query from the development environment 102, and takes care of routing the request to the query engine 112 to get the raw data, and in turn receives the PII data de-identified by the de-identification engine 104.

The development environment 102 includes a role-based access and control (RBAC) module 107, data browser 108, queries/results module 109, feature engineering module 110 and model submission module 111. Feature engineering 110 transforms raw data into features that are suitable for machine learning models (the details of this process(es) are not germane to this disclosure). This module communicates with the queries/results module 109 to receive the de-identified that subsequently will be processed to generate a feature store.

The RBAC module 107 identifies which policy corresponds to the user, based on which data analysts get access to various customer data. The model submissions module 111 manages all the experimental models that need to be trained using the de-identified data. The queries/results module 109 supports each query coming from the data browser 108 or Feature engineering module 110, and communicates with the create views module 106 in the production environment 101 to get the data. The data browser 108 generates a graphical user interface (GUI) to enable users of the development environment 102 (i.e., software developers) to view the de-identified data.

The system shown in FIG. 1A provides a managed, segregated access methodology by which analytics developers and data scientists can get access to customer data without risking the PII or other sensitive elements of customer data. The method revolves around companion workflow engines that perform the authentication and authorization of system users and also filter and de-identify customer data once the output has been generated. The models and queries therefore run directly against customer data, providing the highest fidelity outcomes.

In FIG. 1A there are two types of entities that can access the data from the development environment: 1) human users, e.g., data scientists and developers who use data browsers to visualize the data, and 2) automated pipelines (not shown) within feature engineering module 110, which generate feature stores. In the illustrated embodiment, data is de-identified by the de-identification engine 104 in the runtime engine 101 upon a request to access the data from the development environment 102. Access to the data stored in the production environment 101 is controlled by the RBAC module 107.

Figure 1B:
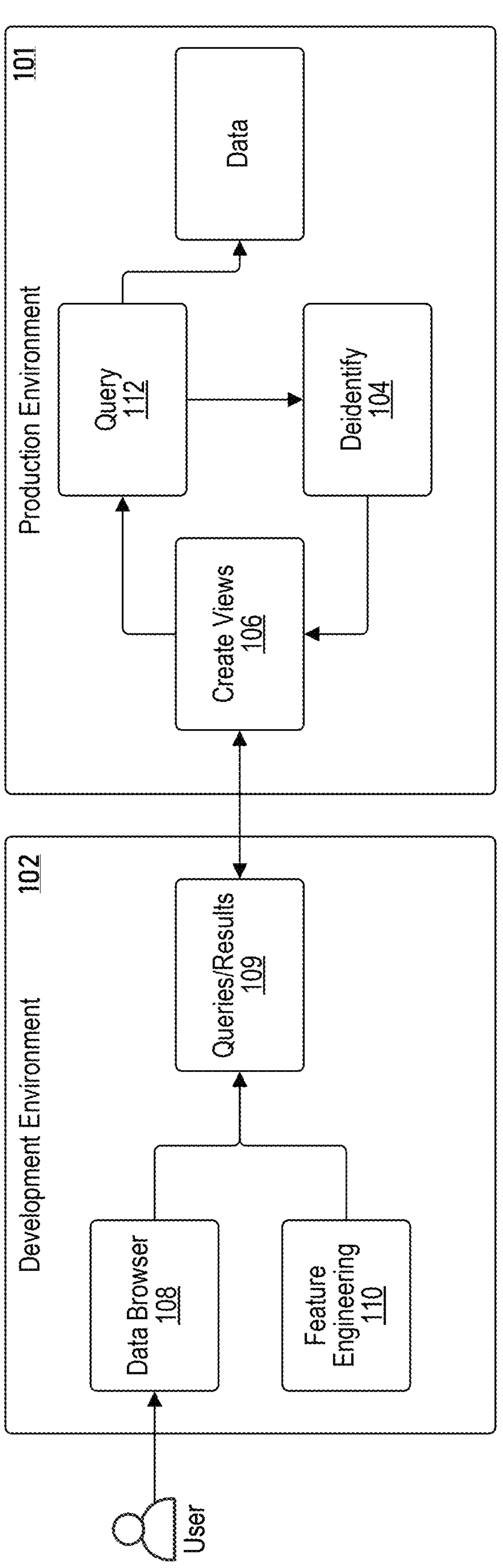
FIG. 1B illustrates the flow of queries and responses between a development environment and a production environment.

In addition to RBAC, which applies to both types entities, users and automated pipelines, levels of access to PII data within the same data source are controlled by the policies to which users are mapped. FIG. 1B illustrates the flow of queries and responses between the development environment 102 and the production environment 101. The create view module 107 receives the request from the development endpoint. Then, using the appropriate user policy and de-identification policy, the de-identify module 104 de-identifies the requested data received from the customer data store.

The table below provides an example of how various data fields (email address, name, address, etc.) may be de-identified. In the "PII?" column, some of the fields are marked as "Yes," meaning that the field contains PII that will be de-identified; while other fields are marked as "Maybe," meaning that the field may be de-identified; and still others are marked as "No," meaning that the field will not be de-identified. Within a company, for example, human resources (HR) personnel may be able to see all of the fields, whether they are marked as PII or not. However, data scientists may be allowed to see all the non-PII fields, but all the PII fields are de-identified when they view it. This type of access control may be based on a policy file.

In addition to the user level policy, there can be region-level policies. For example, the European Union may (EU) may allow sharing the geolocation and internet protocol (IP) address, while the United States may not. The decision whether to de-identify PII or not can be controlled by a policy that specifies which fields need to be de-identified based on the user requesting access to the data and/or based on which region's laws or regulations apply to the data.

| Fields | Data | PII? | Post De-identification EU | Post De-identification USA |
|---|---|---|---|---|
| Email Address | x@xyz.com | Yes | 04b88742-6bef-464b-bb1e-1fb34e997120 | 04b88742-6bef-464b-bb1e-1fb34e997120 |
| Name | abcdef | Yes | 04b88742-6bef-464b-bb1e-1fb34e997122 | 04b88742-6bef-464b-bb1e-1fb34e997122 |
| Address | Abcef Xyz street, California, USA | Yes | 04b88742-6bef-464b-bb1e-1fb34e997123 | 04b88742-6bef-464b-bb1e-1fb34e997123 |
| Social Security Number | 111-111-1111 | Yes | 04b88742-6bef-464b-bb1e-1fb34e997124 | 04b88742-6bef-464b-bb1e-1fb34e997124 |
| Geolocation Data | x = 22.2 y = 33.3 | May be | x = 22.2 y =3 3.3 | 04b88742-6bef-464b-bb1e-1fb34e997127 |
| IP address | 1.1.1.1 | May be | 1.1.1.1 | 04b88742-6bef-464b-bb1e-1fb34e997128 |
| VLAN ID | 256 | No | 256 | 256 |

system to produce corrective action. The cloud development endpoint 303 provides an environment to remove all PII information by preprocessing the data received from various data sources 304 and 305 connected through network 307, and can be an implementation of development environment 102 in FIG. 1.

Figure 4:
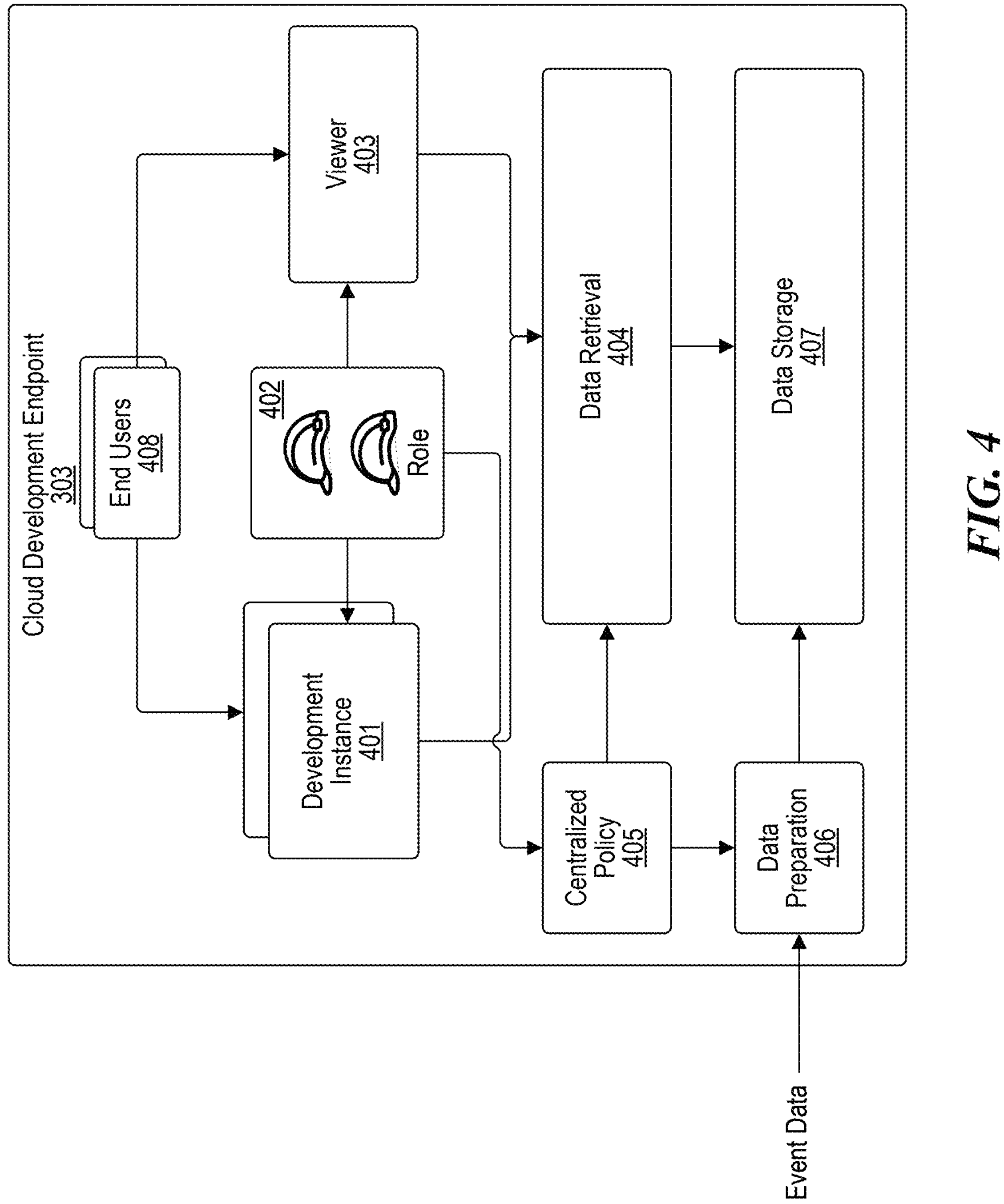
FIG. 4 illustrates elements of the cloud development endpoint.

FIG. 4 illustrates an example of the elements of the cloud development endpoint 303. As shown, cloud development endpoint includes a data preparation module 406, a data storage facility 407, a data retrieval module 404, a centralized policy module 405 and one or more development instances 401. The data preparation module 406 processes all the events received from various data sources to de-identify PII data. The centralized policy module 405 contains rules on how the data need to be processed to de-identify PII information. Data retrieval module 404 can be used to de-identify in real-time the data based on the centralized policy and the RBAC associated with the user. In this context, "centralized" policy means that any end user 408 of the cloud development endpoint 303 can view all the policies that are available and, at least to the extent permitted by RBAC, can choose which policies are to be applied based on the labels, and add new policies with new labels. Further, the centralized policies can be reused by any other end user 408.

The data storage facility 407 stores both PII and non-PII data. Each development instance 401 is a production environment usable by data scientists to develop machine learning models. Viewer 403 enables viewing of the data stored in the data storage facility 407. The level of access to the data for each end user 408 of any development instance 401 or the viewer 403 is governed by the role 402 and the policy 405 to which the end user 408 is mapped.

Figure 5:
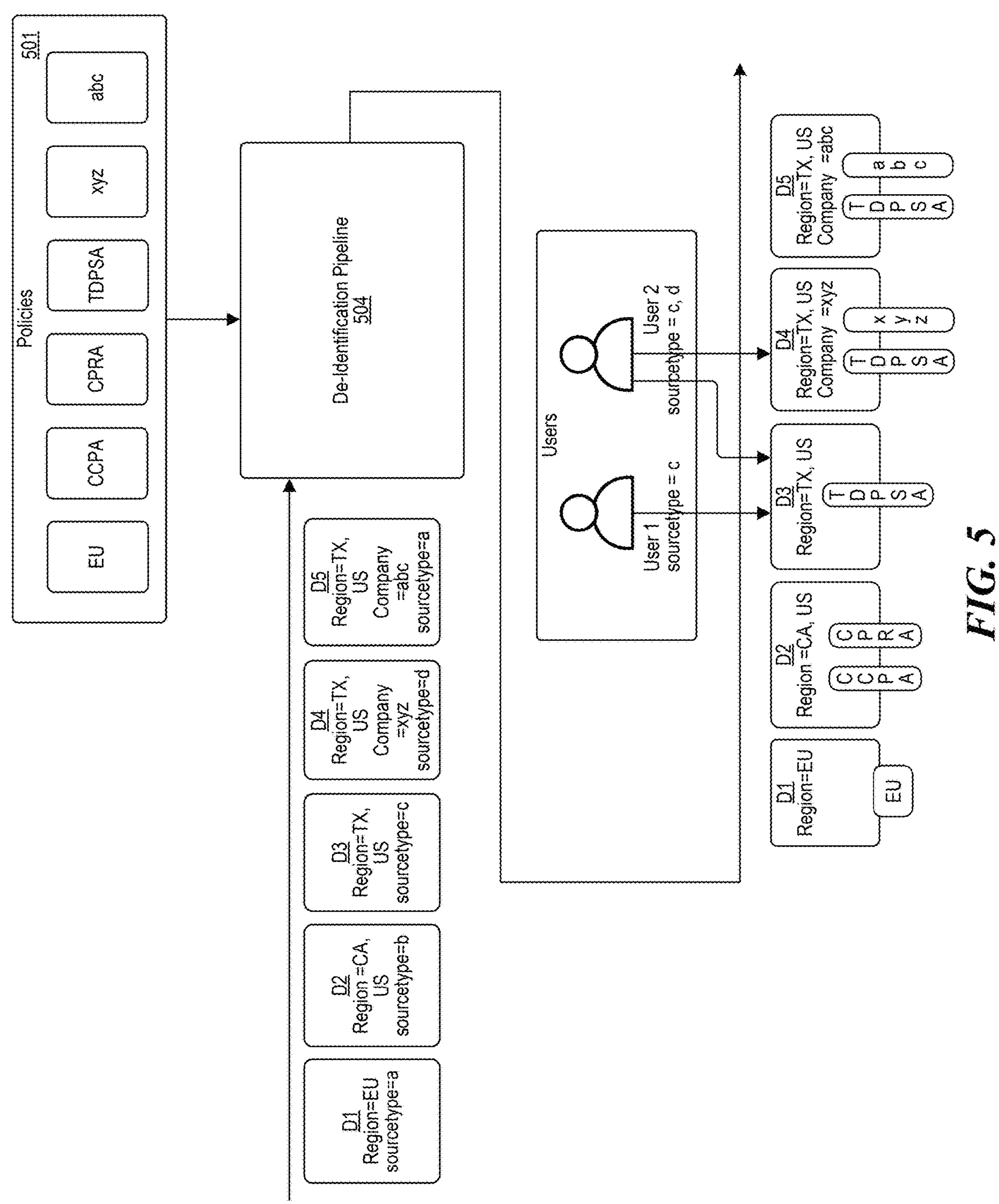
FIG. 5 shows an example of how various policies can be applied to ingested data to control access to PII.

FIG. 5 shows an example of how various policies 501 can be applied to ingested data to control access to PII. In FIG. 5, five different data packets, D1, D2, D3, D4 and D5, are arriving at the de-identification pipeline 504 and are labeled with different tags. Packets D1, D2 and D3 have their region (e.g., region of origin) and source type labeled. Packets D4 and D5 include company information in addition to region and source type. In certain embodiments, source type may be used to index the data and to restrict access to the data for different users. In FIG. 5, User 1 has access to source type c and User2 has access to both source type c and source type d.

Figure 2:
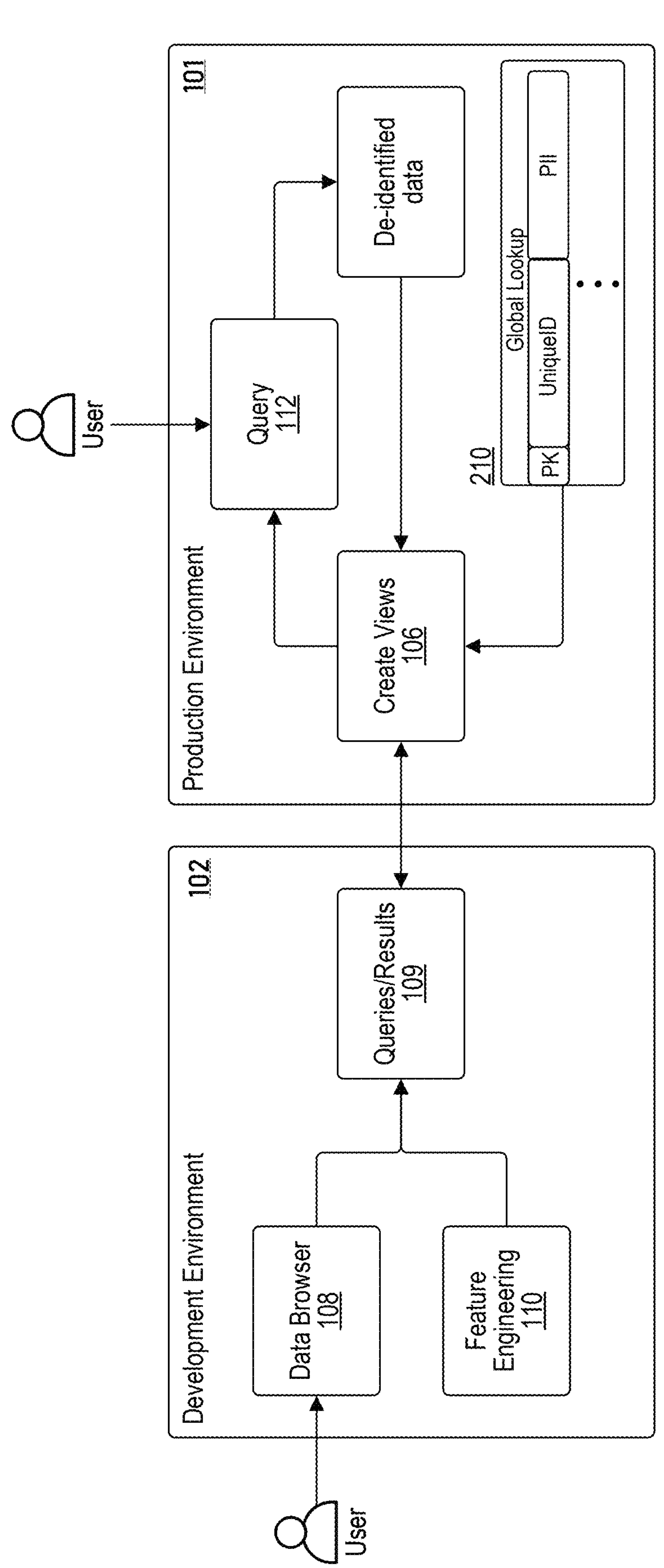
FIG. 2 shows a system in which data is de-identified during ingestion and stored in a data store of the production environment.

In at least some embodiments, policy and labels have a one-to-one mapping, such that each policy corresponds to a Whereas in FIG. 1A data is intact and de-identification happens on request for the data from the development environment, FIG. 2 illustrates another embodiment, in which data is de-identified during ingestion and stored in a data store in the production environment 101. As shown, a global lookup table 210 can be created during the de-identification process, to map each data item of PII to a unique identifier (ID), which can be a hash of the PII. A primary key (PK) can be used to lookup the PII or the corresponding de-identified data. Access to the PII data then can be restricted through RBAC. More specifically, custom views based on RBAC can be used to merge the lookup unique ID with customer de-identified data. Restrictions on who can access the PII can be controlled through RBAC, such that development users can only access de-identified data.

In contrast with FIG. 1B, in which data is de-identified upon request, in the embodiments of FIG. 2, de-identified data is stored in the production environment. When the development environment 102 makes a request to the production environment 101, data from the customer data store is forwarded without any transformation. However, if the request comes from a user of the production environment, de-identified data is replaced by the actual PII data stored in the global lookup table.

Figure 3:
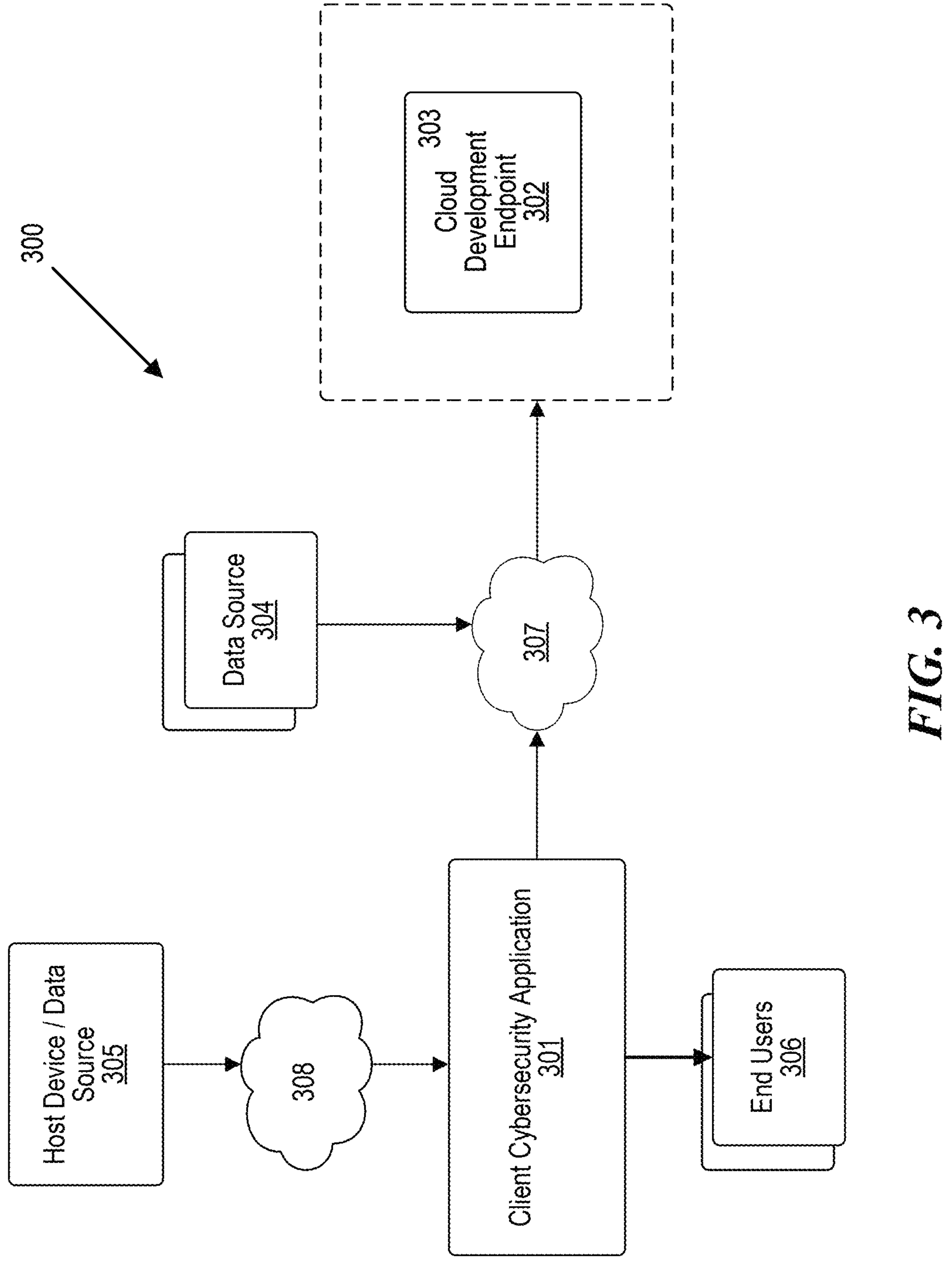
FIG. 3 shows an example of a data processing system including a client application producing data, external data sources and cloud development endpoint for developing AI models.

FIG. 3 shows an example of a data processing system 300 in which the technique introduced here can be implemented. The system 300 includes a host device (a data source) 305 that produces data of interest, one or more end-user devices 306, all coupled to each other by a network 308. Client cybersecurity application 301 indexes and processes data received from various data sources 304 and 305, and such indexed/processed data can be viewed by the end users. The client-side cybersecurity application 301 can be a software application that runs in an enterprise environment that processes the data and produces any security events which can be viewed by the end user or can be sent to an automated label. Since the ingested packets are labeled, the deidentification pipeline is able to select the corresponding policy for each incoming packet. For de-identification, based on the region label in the data packet, the de-identification pipeline 504 selects EU policy for packet D1, CCPA and CPRA for packet D2, and TDPSA for packet D3. Since packets D4 and D5 also include company labels, they have XYZ and abc policies applied to them, respectively, in addition to TDPSA. Once the policies are applied to the data, users can view the data using various methodologies, such as that described above in connection with FIG. 4 or below in connection with FIG. 6.

Figure 6:
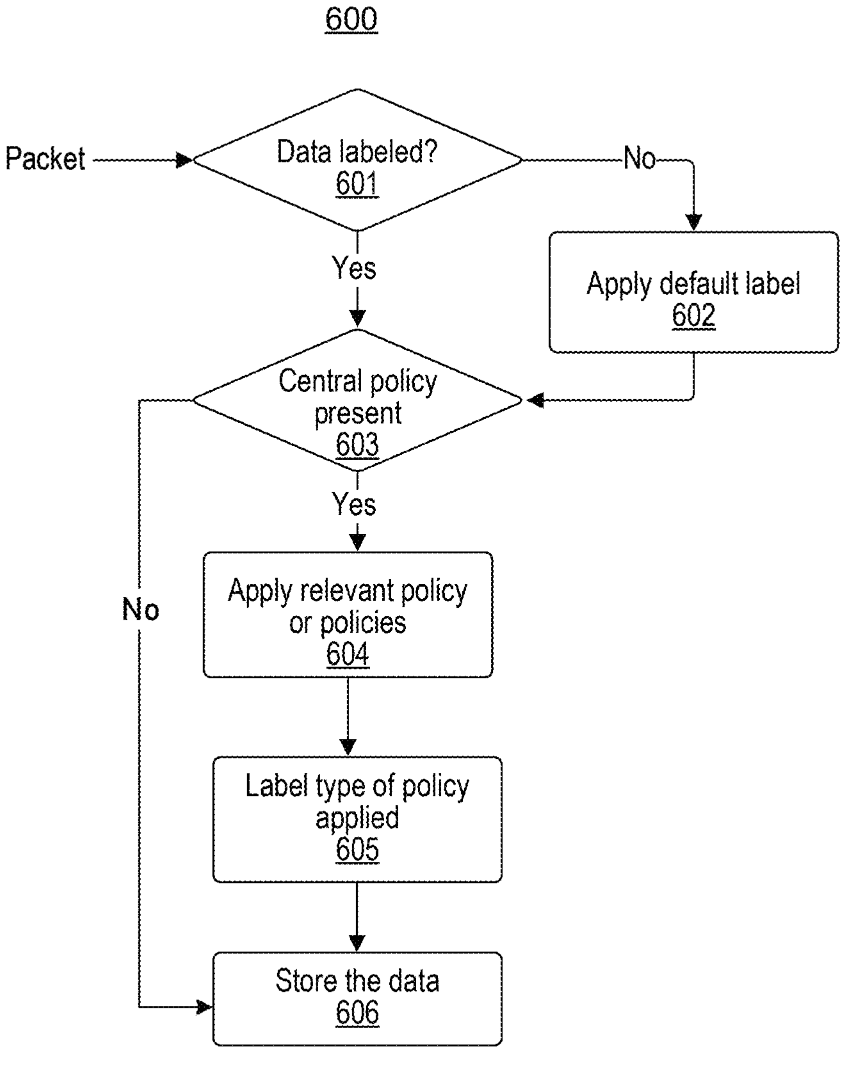
FIG. 6 shows an example of a process by which a data preparation module processes incoming data to de-identify the PII information contained in the data.

FIG. 6 shows an example of a process 600 by which a data preparation module, such as data preparation module 406, processes incoming data to de-identify the PII information contained in the data. Data received from various data sources are normally labeled based on the predefined rules that will be used to understand the schema of the data. When they are not (step 601), a default label can be applied at step 602. Step 603 determines whether one or more centralized policies are present for the applicable label in the incoming packet. If no centralized policy is present at step 603, the data simply stored as is at step 606. A centralized policy for the data can be identified based on the label associated with the incoming event and a stored mapping of labels to policies. At step 604, the data preparation module will apply the policy or policies to de-identify some or all of the PII information before labeling the data to indicate the policy or policies applied at step 605 (e.g., with region, source type, company name, etc.) and then storing the data in the centralized repository at step 606.

Figure 7:
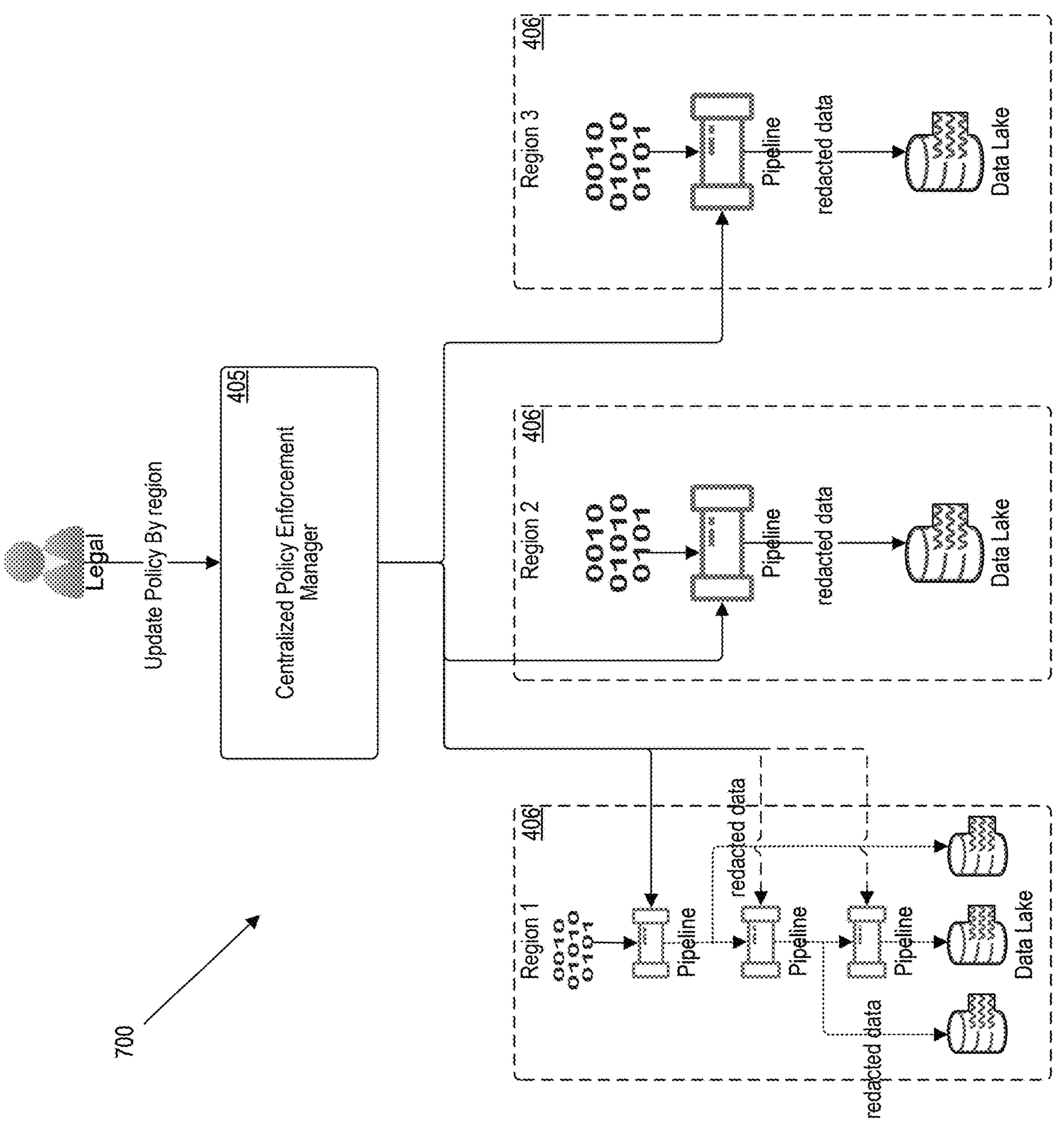
FIG. 7 illustrates a data processing system using which organizations can update their current laws and regulations relating to PII.

FIG. 7 illustrates a data processing system 700 using which organizations can update their current laws and regulations by region, data, team or any classification they want to process the data. As shown in FIG. 7, the system includes a centralized policy manager 405 that communicates with data preparation modules 406 for (in this example) three separate regions, i.e., Region 1, region 2 and Region 3. For each region, the corresponding data preparation module 406 implements one or more de-identification pipelines, each which may be the same or similar in functionality to de-identification pipeline 504 (FIG. 5), and the outputs of which (fully or partially de-identified data) are stored in one or more data lakes for that region. As the data is processed in each de-identification pipeline, based on the classification and policy the data fall under, the system can automatically anonymize, redact or delete certain fields before it is stored in a data lake. The system 700 can store the data at different stages of policy enforcement (illustrated for example by the taps from the outputs of multiple de-identification pipelines within the Region 1 data preparation module 406), which can be shared with multiple entities based on the level of access they have to view the data.

In another embodiment, centralized policy manager 405 determines where data can be accessed from and by whom, enforcing RBAC in accordance with privacy regulations. The system of FIG. 7 makes it possible to completely decouple corporate in-house legal teams from the users of the data. The legal team can seamlessly update a policy, and the de-identification pipeline(s) will automatically interpret the policy and convert it into the proper enforcement mechanism, by selecting the corresponding policy or policies for each packet according to the packet's policy label.

Figure 8:
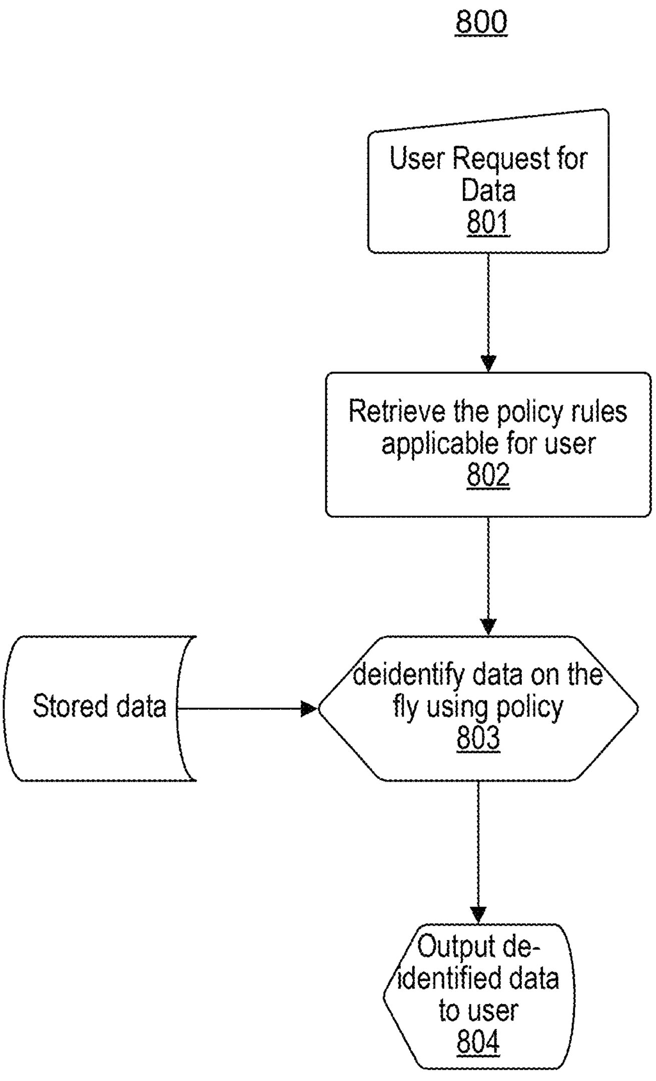
FIG. 8 illustrates a process for performing de-identification while retrieving the data.

In addition to or instead of de-identifying the data while storing it, de-identification logic can be applied while retrieving the data. This approach avoids the need to store duplicate copies of the data based on the policy. Instead, the policy can be applied to any stored data during retrieval, which also avoids unnecessary processing of data that will not be used. FIG. 8 illustrates a process for performing de-identification while retrieving the data. When a user requests any data stored in the data lake at step 801, the system at step 802 selects the corresponding policy for the data and the user using the RBAC applicable to the user. The relevant data preparation module 406 then de-identifies the data on-the-fly at step 803 based on the selected policy, and then causes the de-identified data to be output (e.g., displayed) to the user at step 804.

Figure 9:
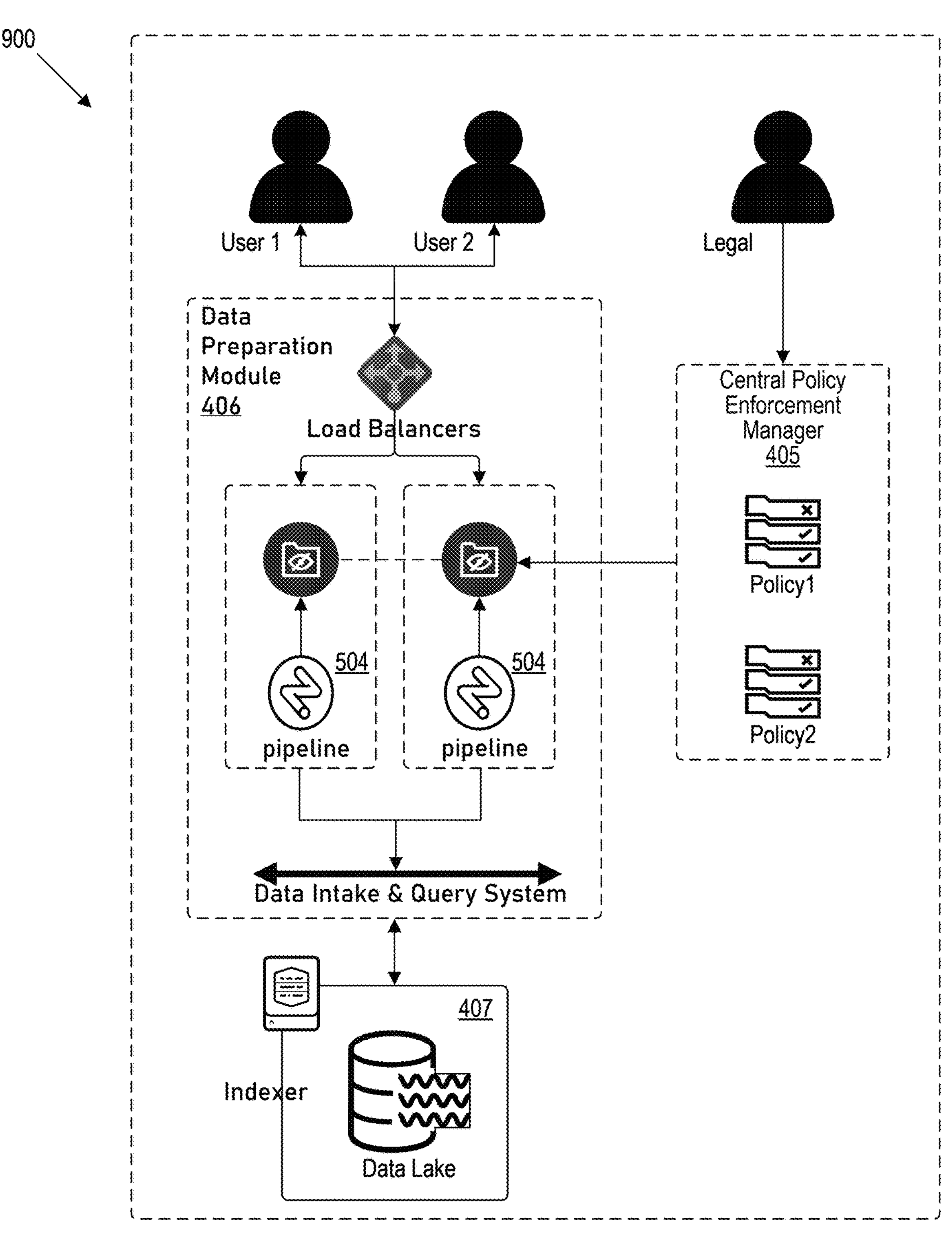
FIG. 9 illustrates another example of a system in which policy owners can update their polices to reflect current laws and regulations relating to PII.

FIG. 9 illustrates another embodiment, including system 900, in which policy owners can update their polices to reflect current laws and regulations relating to PII. After the regulations are applied through the centralized policy enforcement manager 405, any data retrieved from the data lake 407 will immediately have the new policies applied to it. In this embodiment, when a user requests data from the data lake 407, the data goes through the common de-identification pipeline 504, which retrieves the updated user policies and applies them to the data before sharing the data with the user. As shown, there may be multiple instances of any given de-identification pipeline, which one or more load balancers may load-balance between. Since this embodiment sits on top of the data and processes data in real time, it can be placed on top of any existing data lake.

Furthermore, this embodiment provides, in addition to RBAC, role based personal identifiable information access (RBPIIAC) to the data. As can be seen from FIG. 9, data indexers hold all customer data, and there is only one copy of the customer data. When development users access the customer data though a search head (discussed further below), data access to an index is restricted based on RBAC. In addition to RBAC, the data goes through a RBPIIAC pipeline in which PII data is redacted, masked, or anonymized based on a centralized policy.

Figure 10:
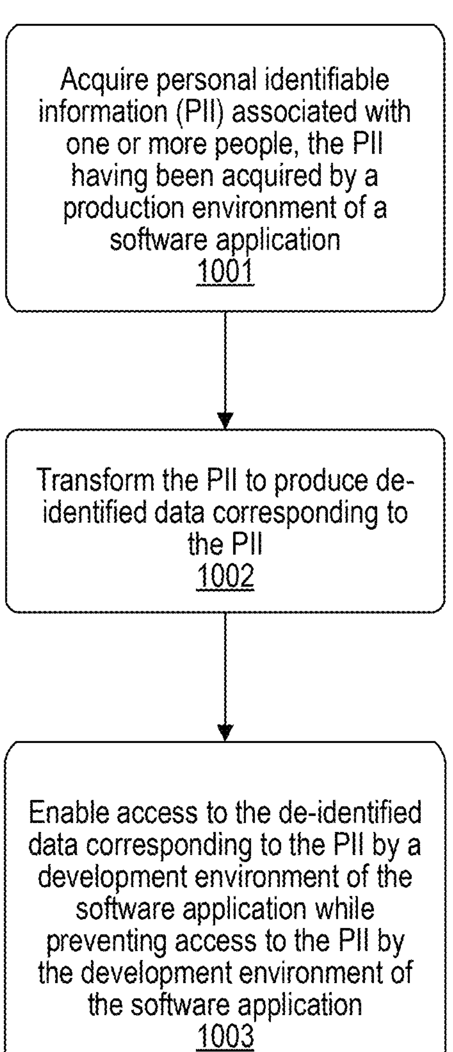
FIG. 10 is a flowchart illustrating an example process for enabling software developers to access customer data while protecting PII in the customer data.

FIG. 10 is a flowchart illustrating an example process 1000 for enabling software developers to access customer data while protecting PII in the customer data. The example process 1000 can be implemented, for example, by a computing device that comprises a processor and a non-transitory computer-readable medium. The non-transitory computer readable medium can be storing instructions that, when executed by the processor, can cause the processor to perform the operations of the illustrated process 1000. Alternatively or additionally, the process 1000 can be implemented using a non-transitory computer-readable medium storing instructions that, when executed by one or more processors, cause the one or more processors to perform the operations of the process 1000 of FIG. 10. The process 1000 can be performed by, for example, a system such as illustrated in FIGS. 1 through 9 above.

In FIG. 10, at step 1001, the process 1000 acquires PII associated with one or more people, where the PII has been acquired by a production environment of a software application. At step 1002 the process 1000 transforms (e.g., de-identifies) the PII to produce de-identified data corresponding to the PII. At step 1003 the process 1000 enables access to the de-identified data corresponding to the PII by a development environment of the software application, while preventing access to the PII by the development environment of the software application.

In some embodiments, the transforming step 1002 may be performed in response to a request for data containing the PII from a user of the development environment of the software application. On the other hand, the transforming step 1002 may be performed in the production environment of the software application upon acquisition of data containing the PII by the production environment of the software application, prior to any request for the data containing the PII from the development environment of the software application. In the latter case, the transforming step 1002 may comprise updating a lookup table with a key that maps the de-identified data to the PII. The transforming step 1002 alternatively may be performed in the development environment of the software application, prior to any request for the data containing the PII from a user of the development environment.

In some embodiments, the process 1000 further comprises enabling the user of the development environment to use the de-identified data to train one or more machine learning models associated with the software application. The software application may be, for example, a cybersecurity application.

In some embodiments, the enabling access to the de-identified data and the preventing access to the de-identified data collectively comprises applying a de-identification policy to the PII to produce the de-identified data, and applying RBAC to control access by a plurality of software development users to the de-identified data. The de-identification policy and RBAC may be applied in the development environment.

In some embodiments, applying the de-identification policy comprises automatically selecting a region-specific de-identification policy, of a plurality of region-specific de-identification policies, for use in de-identifying the PII, and the plurality of region-specific de-identification policies comprise de-identification policies for a plurality of different geographic regions corresponding respectively to a plurality of different political entities. Selecting the region-specific de-identification policy may be based on a region identifier contained in a received data packet that contains the PII. The RBAC may be based on a source type identifier in the data packet.

In some embodiments, the process 1000 further comprises generating, by a computer system, a user interface that enables an administrative user to specify and update a plurality of data de-identification policies, including a separate data de-identification policy, to be applied by a computer system, for ingested data associated with each of a plurality of geographic regions. The plurality of geographic regions may correspond respectively to a plurality of different political entities that have different data privacy laws. The process 1000 may further comprise ingesting, into the computer system, a plurality of data elements, each containing at least a portion of the PII, and determining, by the computer system, a geographic region associated with each of the data elements. In that case, the step 1002 of transforming the PII to produce deidentified data may include automatically identifying a de-identification policy to use for each of the data elements, based on the associated geographic region.

In some embodiments, the process 1000 further comprises ingesting, into the computer system, a data element containing PII, and in response to the ingesting of the data element, performing the transforming step 1002, including applying a de-identification policy to the data element, and storing a plurality of versions of the data element. Each version may represent the data element after a different level of PII de-identification has been performed. In such embodiments, the process 1000 may further comprise receiving, from a user, a request for access to the data element, determining a level of access associated with the user; and selecting one of the stored plurality of versions of the data element to be provided to the user, based on the level of access associated with the user.

In some embodiments, the process 1000 further comprises receiving, from a user, a request for access to a stored data element that includes PII, and determining a level of access associated with the user. in such embodiments, the process 1000 may further comprise, in response to the request for access to the stored data element, selecting one of a plurality of de-identification policies to be applied to the data element based on the level of access associated with the user, where each of the plurality of de-identification policies corresponds to a different level of PII de-identification; retrieving the stored data element; applying the selected de-identification policy to the data element to produce a modified data element; and providing the modified data element to the user.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (SaaS) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 11:
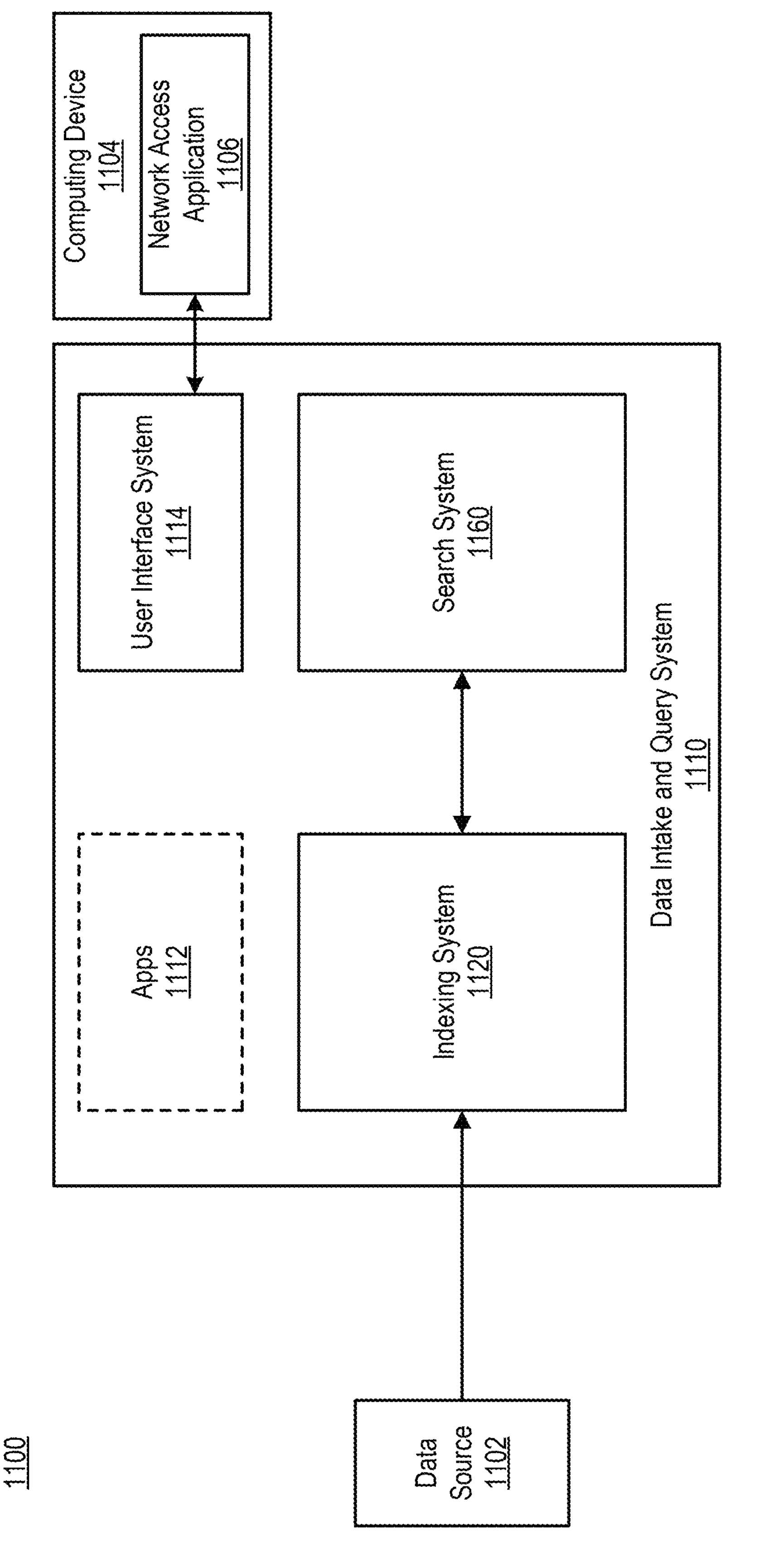
FIG. 11 is a block diagram illustrating an example computing environment that includes a data intake and query system.

FIG. 11 is a block diagram illustrating an example computing environment 1100 that includes a data intake and query system 1110. The data intake and query system 1110 obtains data from a data source 1102 in the computing environment 1100, and ingests the data using an indexing system 1120. A search system 1160 of the data intake and query system 1110 enables users to navigate the indexed data. Though drawn with separate boxes in FIG. 11, in some implementations the indexing system 1120 and the search system 1160 can have overlapping components. A computing device 1104, running a network access application 1106, can communicate with the data intake and query system 1110 through a user interface system 1114 of the data intake and query system 1110. Using the computing device 1104, a user can perform various operations with respect to the data intake and query system 1110, such as administration of the data intake and query system 1110, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 1110 can further optionally include apps 1112 that extend the search, analytics, and/or visualization capabilities of the data intake and query system 1110.

The data intake and query system 1110 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 1110 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 1110 can be executed on a single computing device, or execution of the program code can be distributed over multiple computing devices. For example, the program code can include instructions for both indexing and search components (which may be part of the indexing system 1120 and/or the search system 1160, respectively), which can be executed on a computing device that also provides the data source 1102. As another example, the program code can be executed on one computing device, where execution of the program code provides both indexing and search components, while another copy of the program code executes on a second computing device that provides the data source 1102. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 1102 of the computing environment 1100 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 1102 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 1120 obtains machine date from the data source 1102 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 1120 does not require prior knowledge of the structure of incoming data (e.g., the indexing system 1120 does not need to be provided with a schema describing the data). Additionally, the indexing system 1120 retains a copy of the data as it was received by the indexing system 1120 such that the original data is always available for searching (e.g., no data is discarded, though, in some examples, the indexing system 1120 can be configured to do so).

The search system 1160 searches the data stored by the indexing 1120 system. As discussed in greater detail below, the search system 1160 enables users associated with the computing environment 1100 (and possibly also other users) to navigate the data, generate reports, and visualize search results in "dashboards" output using a graphical interface. Using the facilities of the search system 1160, users can obtain insights about the data, such as retrieving events from an index, calculating metrics, searching for specific conditions within a rolling time window, identifying patterns in the data, and predicting future trends, among other examples. To achieve greater efficiency, the search system 1160 can apply map-reduce methods to parallelize searching of large volumes of data. Additionally, because the original data is available, the search system 1160 can apply a schema to the data at search time. This allows different structures to be applied to the same data, or for the structure to be modified if or when the content of the data changes. Application of a schema at search time may be referred to herein as a late-binding schema technique.

The user interface system 1114 provides mechanisms through which users associated with the computing environment 1100 (and possibly others) can interact with the data intake and query system 1110. These interactions can include configuration, administration, and management of the indexing system 1120, initiation and/or scheduling of queries that are to be processed by the search system 1160, receipt or reporting of search results, and/or visualization of search results. The user interface system 1114 can include, for example, facilities to provide a command line interface or a web-based interface.

Users can access the user interface system 1114 using a computing device 1104 that communicates with data intake and query system 1110, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 1100. For example, a person can log in as a particular user and, using the user's digital information, can access the data intake and query system 1110. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 1104 can provide a human-machine interface through which a person can have a digital presence in the computing environment 1100 in the form of a user. The computing device 1104 is an electronic device having one or more processors and a memory capable of storing instructions for execution by the one or more processors. The computing device 1104 can further include input/output (I/O) hardware and a network interface. Applications executed by the computing device 1104 can include a network access application 1106, such as a web browser, which can use a network interface of the client computing device 1104 to communicate, over a network, with the user interface system 1114 of the data intake and query system 1110. The user interface system 1114 can use the network access application 1106 to generate user interfaces that enable a user to interact with the data intake and query system 1110. A web browser is one example of a network access application. A shell tool can also be used as a network access application. In some examples, the data intake and query system 1110 is an application executing on the computing device 1106. In such examples, the network access application 1106 can access the user interface system 1114 without going over a network.

The data intake and query system 1110 can optionally include apps 1112. An app of the data intake and query system 1110 is a collection of configurations, knowledge objects (a user-defined entity that enriches the data in the data intake and query system 1110), views, and dashboards that may provide additional functionality, different techniques for searching the data, and/or additional insights into the data. The data intake and query system 1110 can execute multiple applications simultaneously. Example applications include an information technology service intelligence application, which can monitor and analyze the performance and behavior of the computing environment 1100, and an enterprise security application, which can include content and searches to assist security analysts in diagnosing and acting on anomalous or malicious behavior in the computing environment 1100.

Though FIG. 11 illustrates only one data source, in practical implementations, the computing environment 1100 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 1100, the data intake and query system 1110 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 1100 can include on-prem and cloud-based computing resources, or only cloud-based resources. For example, an entity may have on-prem computing devices and a private cloud. In this example, the entity operates the data intake and query system 1110 and can choose to execute the data intake and query system 1110 on an on-prem computing device or in the cloud. In another example, a provider entity operates the data intake and query system 1110 in a public cloud and provides the functionality of the data intake and query system 1110 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 1110. In some implementations, the entity providing the data intake and query system 1110 is itself subscribing to the cloud services of a cloud service provider. As an example, a first entity provides computing resources under a public cloud service model, a second entity subscribes to the cloud services of the first provider entity and uses the cloud computing resources to operate the data intake and query system 1110, and a third entity can subscribe to the services of the second provider entity in order to use the functionality of the data intake and query system 1110. In this example, the data sources are associated with the third entity, users accessing the data intake and query system 1110 are associated with the third entity, and the analytics and insights provided by the data intake and query system 1110 are for purposes of the third entity's operations.

Figure 12:
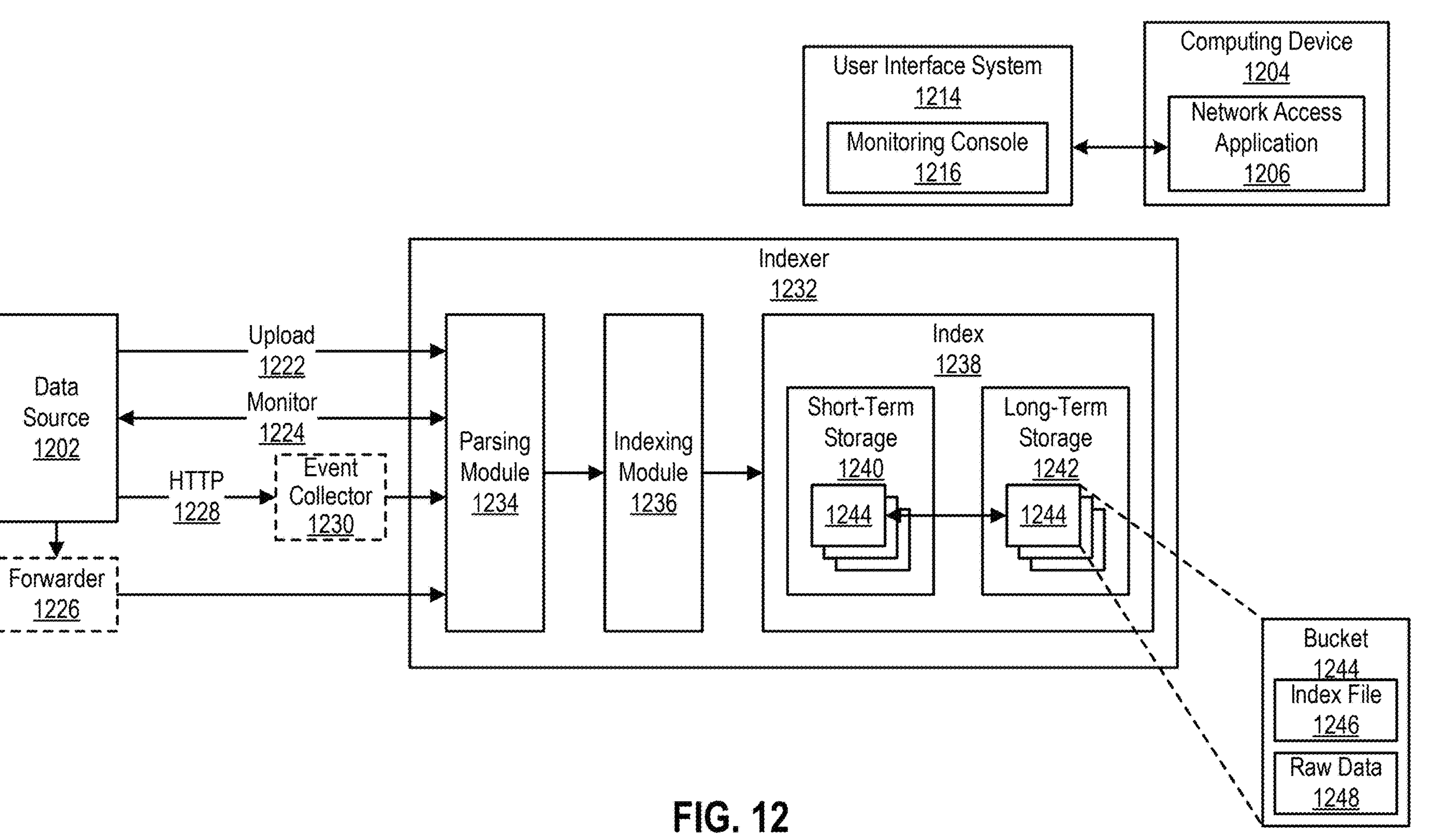
FIG. 12 is a block diagram illustrating in greater detail an example of an indexing system of a data intake and query system, such as the data intake and query system of FIG. 23.

FIG. 12 is a block diagram illustrating in greater detail an example of an indexing system 1220 of a data intake and query system, such as the data intake and query system 1110 of FIG. 11. The indexing system 1220 of FIG. 12 uses various methods to obtain machine data from a data source 1202 and stores the data in an index 1238 of an indexer 1232. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 1220 enables the data intake and query system to obtain the machine data produced by the data source 1202 and to store the data for searching and retrieval.

Users can administer the operations of the indexing system 1220 using a computing device 1204 that can access the indexing system 1220 through a user interface system 1214 of the data intake and query system. For example, the computing device 1204 can be executing a network access application 1206, such as a web browser or a terminal, through which a user can access a monitoring console 1216 provided by the user interface system 1214. The monitoring console 1216 can enable operations such as: identifying the data source 1202 for data ingestion; configuring the indexer 1232 to index the data from the data source 1232; configuring a data ingestion method; configuring, deploying, and managing clusters of indexers; and viewing the topology and performance of a deployment of the data intake and query system, among other operations. The operations performed by the indexing system 1220 may be referred to as "index time" operations, which are distinct from "search time" operations that are discussed further below.

The indexer 1232, which may be referred to herein as a data indexing component, coordinates and performs most of the index time operations. The indexer 1232 can be implemented using program code that can be executed on a computing device. The program code for the indexer 1232 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 1232. In some implementations, the indexer 1232 executes on the computing device 1204 through which a user can access the indexing system 1220. In some implementations, the indexer 1232 executes on a different computing device than the illustrated computing device 1204.

The indexer 1232 may be executing on the computing device that also provides the data source 1202 or may be executing on a different computing device. In implementations wherein the indexer 1232 is on the same computing device as the data source 1202, the data produced by the data source 1202 may be referred to as "local data." In other implementations the data source 1202 is a component of a first computing device and the indexer 1232 executes on a second computing device that is different from the first computing device. In these implementations, the data produced by the data source 1202 may be referred to as "remote data." In some implementations, the first computing device is "on-prem" and in some implementations the first computing device is "in the cloud." In some implementations, the indexer 1232 executes on a computing device in the cloud and the operations of the indexer 1232 are provided as a service to entities that subscribe to the services provided by the data intake and query system.

For a given data produced by the data source 1202, the indexing system 1220 can be configured to use one of several methods to ingest the data into the indexer 1232. These methods include upload 1222, monitor 1224, using a forwarder 1226, or using HyperText Transfer Protocol (HTTP 1228) and an event collector 1230. These and other methods for data ingestion may be referred to as "getting data in" (GDI) methods.

Using the upload 1222 method, a user can specify a file for uploading into the indexer 1232. For example, the monitoring console 1216 can include commands or an interface through which the user can specify where the file is located (e.g., on which computing device and/or in which directory of a file system) and the name of the file. The file may be located at the data source 1202 or maybe on the computing device where the indexer 1232 is executing. Once uploading is initiated, the indexer 1232 processes the file, as discussed further below. Uploading is a manual process and occurs when instigated by a user. For automated data ingestion, the other ingestion methods are used.

The monitor 1224 method enables the indexing system 1202 to monitor the data source 1202 and continuously or periodically obtain data produced by the data source 1202 for ingestion by the indexer 1232. For example, using the monitoring console 1216, a user can specify a file or directory for monitoring. In this example, the indexing system 1202 can execute a monitoring process that detects whenever the file or directory is modified and causes the file or directory contents to be sent to the indexer 1232. As another example, a user can specify a network port for monitoring. In this example, a monitoring process can capture data received at or transmitting from the network port and cause the data to be sent to the indexer 1232. In various examples, monitoring can also be configured for data sources such as operating system event logs, performance data generated by an operating system, operating system registries, operating system directory services, and other data sources.

Monitoring is available when the data source 1202 is local to the indexer 1232 (e.g., the data source 1202 is on the computing device where the indexer 1232 is executing). Other data ingestion methods, including forwarding and the event collector 1230, can be used for either local or remote data sources.

A forwarder 1226, which may be referred to herein as a data forwarding component, is a software process that sends data from the data source 1202 to the indexer 1232. The forwarder 1226 can be implemented using program code that can be executed on the computer device that provides the data source 1202. A user launches the program code for the forwarder 1226 on the computing device that provides the data source 1202. The user can further configure the forwarder 1226, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 1226 can provide various capabilities. For example, the forwarder 1226 can send the data unprocessed or can perform minimal processing on the data before sending the data to the indexer 1232. Minimal processing can include, for example, adding metadata tags to the data to identify a source, source type, and/or host, among other information, dividing the data into blocks, and/or applying a timestamp to the data. In some implementations, the forwarder 1226 can break the data into individual events (event generation is discussed further below) and send the events to a receiver. Other operations that the forwarder 1226 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 1230 provides an alternate method for obtaining data from the data source 1202. The event collector 1230 enables data and application events to be sent to the indexer 1232 using HTTP 1228. The event collector 1230 can be implemented using program code that can be executing on a computing device. The program code may be a component of the data intake and query system or can be a standalone component that can be executed independently of the data intake and query system and operates in cooperation with the data intake and query system.

To use the event collector 1230, a user can, for example using the monitoring console 1216 or a similar interface provided by the user interface system 1214, enable the event collector 1230 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 1202 as an alternative method to using a username and password for authentication.

To send data to the event collector 1230, the data source 1202 is supplied with a token and can then send HTTP 1228 requests to the event collector 1230. To send HTTP 1228 requests, the data source 1202 can be configured to use an HTTP client and/or to use logging libraries such as those supplied by Java, JavaScript, and .NET libraries. An HTTP client enables the data source 1202 to send data to the event collector 1230 by supplying the data, and a Uniform Resource Identifier (URI) for the event collector 1230 to the HTTP client. The HTTP client then handles establishing a connection with the event collector 1230, transmitting a request containing the data, closing the connection, and receiving an acknowledgment if the event collector 1230 sends one. Logging libraries enable HTTP 1228 requests to the event collector 1230 to be generated directly by the data source. For example, an application can include or link a logging library, and through functionality provided by the logging library manage establishing a connection with the event collector 1230, transmitting a request, and receiving an acknowledgement.

An HTTP 1228 request to the event collector 1230 can contain a token, a channel identifier, event metadata, and/or event data. The token authenticates the request with the event collector 1230. The channel identifier, if available in the indexing system 1220, enables the event collector 1230 to segregate and keep separate data from different data sources. The event metadata can include one or more key-value pairs that describe the data source 1202 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 1230 extracts events from HTTP 1228 requests and sends the events to the indexer 1232. The event collector 1230 can further be configured to send events to one or more indexers. Extracting the events can include associating any metadata in a request with the event or events included in the request. In these implementations, event generation by the indexer 1232 (discussed further below) is bypassed, and the indexer 1232 moves the events directly to indexing. In some implementations, the event collector 1230 extracts event data from a request and outputs the event data to the indexer 1232, and the indexer generates events from the event data. In some implementations, the event collector 1230 sends an acknowledgement message to the data source 1202 to indicate that the event collector 1230 has received a particular request form the data source 1202, and/or to indicate to the data source 1202 that events in the request have been added to an index.

The indexer 1232 ingests incoming data and transforms the data into searchable knowledge in the form of events. In the data intake and query system, an event is a single piece of data that represents activity of the component represented in FIG. 12 by the data source 1202. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 1232 can include a parsing module 1234 and an indexing module 1236 for generating and storing the events. The parsing module 1234 and indexing module 1236 can be modular and pipelined, such that one component can be operating on a first set of data while the second component is simultaneously operating on a second sent of data. Additionally, the indexer 1232 may at any time have multiple instances of the parsing module 1234 and indexing module 1236, with each set of instances configured to simultaneously operate on data from the same data source or from different data sources. The parsing module 1234 and indexing module 1236 are illustrated in FIG. 12 to facilitate discussion, with the understanding that implementations with other components are possible to achieve the same functionality.

The parsing module 1234 determines information about incoming event data, where the information can be used to identify events within the event data. For example, the parsing module 1234 can associate a source type with the event data. A source type identifies the data source 1202 and describes a possible data structure of event data produced by the data source 1202. For example, the source type can indicate which fields to expect in events generated at the data source 1202 and the keys for the values in the fields, and possibly other information such as sizes of fields, an order of the fields, a field separator, and so on. The source type of the data source 1202 can be specified when the data source 1202 is configured as a source of event data. Alternatively, the parsing module 1234 can determine the source type from the event data, for example from an event field in the event data or using machine learning techniques applied to the event data.

Other information that the parsing module 1234 can determine includes timestamps. In some cases, an event includes a timestamp as a field, and the timestamp indicates a point in time when the action represented by the event occurred or was recorded by the data source 1202 as event data. In these cases, the parsing module 1234 may be able to determine from the source type associated with the event data that the timestamps can be extracted from the events themselves. In some cases, an event does not include a timestamp and the parsing module 1234 determines a timestamp for the event, for example from a name associated with the event data from the data source 1202 (e.g., a file name when the event data is in the form of a file) or a time associated with the event data (e.g., a file modification time). As another example, when the parsing module 1234 is not able to determine a timestamp from the event data, the parsing module 1234 may use the time at which it is indexing the event data. As another example, the parsing module 1234 can use a user-configured rule to determine the timestamps to associate with events.

The parsing module 1234 can further determine event boundaries. In some cases, a single line (e.g., a sequence of characters ending with a line termination) in event data represents one event while in other cases, a single line represents multiple events. In yet other cases, one event may span multiple lines within the event data. The parsing module 1234 may be able to determine event boundaries from the source type associated with the event data, for example from a data structure indicated by the source type. In some implementations, a user can configure rules the parsing module 1234 can use to identify event boundaries.

The parsing module 1234 can further extract data from events and possibly also perform transformations on the events. For example, the parsing module 1234 can extract a set of fields (key-value pairs) for each event, such as a host or hostname, source or source name, and/or source type. The parsing module 1234 may extract certain fields by default or based on a user configuration. Alternatively or additionally, the parsing module 1234 may add fields to events, such as a source type or a user-configured field. As another example of a transformation, the parsing module 1234 can anonymize fields in events to mask sensitive information, such as social security numbers or account numbers. Anonymizing fields can include changing or replacing values of specific fields. The parsing component 1234 can further perform user-configured transformations.

The parsing module 1234 outputs the results of processing incoming event data to the indexing module 1236, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 1232 can be configured to identify searchable segments that are parts of fields, searchable segments that are entire fields, or both. The parsing module 1234 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 1246, to find event data that matches a search query. In some implementations, segmentation can alternatively be performed by the forwarder 1226. Segmentation can also be disabled, in which case the indexer 1232 will not build a lexicon for the event data. When segmentation is disabled, the search system searches the event data directly.

Building index data structures generates the index 1238. The index 1238 is a storage data structure on a storage device (e.g., a disk drive or other physical device for storing digital data). The storage device may be a component of the computing device on which the indexer 1232 is operating (referred to herein as local storage) or may be a component of a different computing device (referred to herein as remote storage) that the indexer 1238 has access to over a network. The indexer 1232 can manage more than one index and can manage indexes of different types. For example, the indexer 1232 can manage event indexes, which impose minimal structure on stored data and can accommodate any type of data. As another example, the indexer 1232 can manage metrics indexes, which use a highly structured format to handle the higher volume and lower latency demands associated with metrics data.

The indexing module 1236 organizes files in the index 1238 in directories referred to as buckets. The files in a bucket 1244 can include raw data files, index files, and possibly also other metadata files. As used herein, "raw data" means data as when the data was produced by the data source 1202, without alteration to the format or content. As noted previously, the parsing component 1234 may add fields to event data and/or perform transformations on fields in the event data. Event data that has been altered in this way is referred to herein as enriched data. A raw data file 1248 can include enriched data, in addition to or instead of raw data. The raw data file 1248 may be compressed to reduce disk usage. An index file 1246, which may also be referred to herein as a "time-series index" or tsidx file, contains metadata that the indexer 1232 can use to search a corresponding raw data file 1248. As noted above, the metadata in the index file 1246 includes a lexicon of the event data, which associates each unique keyword in the event data with a reference to the location of event data within the raw data file 1248. The keyword data in the index file 1246 may also be referred to as an inverted index. In various implementations, the data intake and query system can use index files for other purposes, such as to store data summarizations that can be used to accelerate searches.

A bucket 1244 includes event data for a particular range of time. The indexing module 1236 arranges buckets in the index 1238 according to the age of the buckets, such that buckets for more recent ranges of time are stored in short-term storage 1240 and buckets for less recent ranges of time are stored in long-term storage 1242. Short-term storage 1240 may be faster to access while long-term storage 1242 may be slower to access. Buckets may be moves from short-term storage 1240 to long-term storage 1242 according to a configurable data retention policy, which can indicate at what point in time a bucket is old enough to be moved.

A bucket's location in short-term storage 1240 or long-term storage 1242 can also be indicated by the bucket's status. As an example, a bucket's status can be "hot," "warm," "cold," "frozen," or "thawed." In this example, hot bucket is one to which the indexer 1232 is writing data and the bucket becomes a warm bucket when the index 1232 stops writing data to it. In this example, both hot and warm buckets reside in short-term storage 1240. Continuing this example, when a warm bucket is moved to long-term storage 1242, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 1220 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 1220 through the monitoring console 1216 provided by the user interface system 1214. Using the monitoring console 1216, the user can configure and monitor an index cluster, and see information such as disk usage by an index, volume usage by an indexer, index and volume size over time, data age, statistics for bucket types, and bucket settings, among other information.

Figure 13:
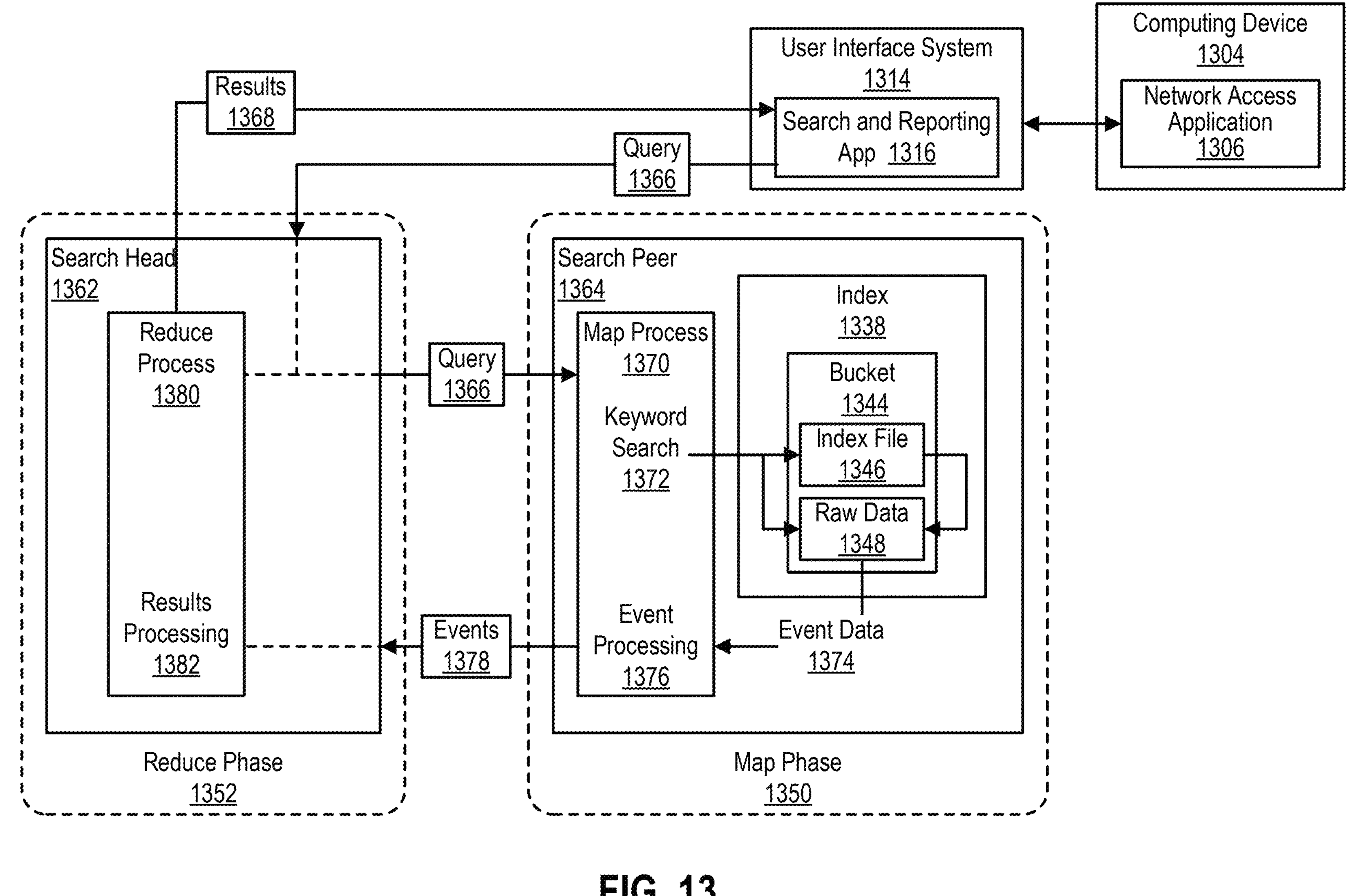
FIG. 13 is a block diagram illustrating in greater detail an example of the search system of a data intake and query system, such as the data intake and query system of FIG. 23.

FIG. 13 is a block diagram illustrating in greater detail an example of the search system 1360 of a data intake and query system, such as the data intake and query system 1110 of FIG. 11. The search system 1360 of FIG. 13 issues a query 1366 to a search head 1362, which sends the query 1366 to a search peer 1364. Using a map process 1370, the search peer 1364 searches the appropriate index 1338 for events identified by the query 1366 and sends events 1378 so identified back to the search head 1362. Using a reduce process 1382, the search head 1362 processes the events 1378 and produces results 1368 to respond to the query 1366. The results 1368 can provide useful insights about the data stored in the index 1338. These insights can aid in the administration of information technology systems, in security analysis of information technology systems, and/or in analysis of the development environment provided by information technology systems.

The query 1366 that initiates a search is produced by a search and reporting app 1316 that is available through the user interface system 1314 of the data intake and query system. Using a network access application 1306 executing on a computing device 1304, a user can input the query 1366 into a search field provided by the search and reporting app 1316. Alternatively or additionally, the search and reporting app 1316 can include pre-configured queries or stored queries that can be activated by the user. In some cases, the search and reporting app 1316 initiates the query 1366 when the user enters the query 1366. In these cases, the query 1366 maybe referred to as an "ad-hoc" query. In some cases, the search and reporting app 1316 initiates the query 1366 based on a schedule. For example, the search and reporting app 1316 can be configured to execute the query 1366 once per hour, once per day, at a specific time, on a specific date, or at some other time that can be specified by a date, time, and/or frequency. These types of queries maybe referred to as scheduled queries.

The query 1366 is specified using a search processing language. The search processing language includes commands or search terms that the search peer 1364 will use to identify events to return in the search results 1368. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 1366 to include sequential commands, where a subsequent command may operate on the results of a prior command. As an example, sequential commands may be separated in the query 1366 by a vertical line ("|" or "pipe") symbol.

In addition to one or more search commands, the query 1366 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 1366 occurs in two broad phases: a map phase 1350 and a reduce phase 1352. The map phase 1350 takes place across one or more search peers. In the map phase 1350, the search peers locate event data that matches the search terms in the search query 1366 and sorts the event data into field-value pairs. When the map phase 1350 is complete, the search peers send events that they have found to one or more search heads for the reduce phase 1352. During the reduce phase 1352, the search heads process the events through commands in the search query 1366 and aggregate the events to produce the final search results 1368.

A search head, such as the search head 1362 illustrated in FIG. 13, is a component of the search system 1360 that manages searches. The search head 1362, which may also be referred to herein as a search management component, can be implemented using program code that can be executed on a computing device. The program code for the search head 1362 can be stored on a non-transitory computer-readable medium and from this medium can be loaded or copied to the memory of a computing device. One or more hardware processors of the computing device can read the program code from the memory and execute the program code in order to implement the operations of the search head 1362.

Upon receiving the search query 1366, the search head 1362 directs the query 1366 to one or more search peers, such as the search peer 1364 illustrated in FIG. 13. "Search peer" is an alternate name for "indexer" and a search peer may be largely similar to the indexer described previously. The search peer 1364 may be referred to as a "peer node" when the search peer 1364 is part of an indexer cluster. The search peer 1364, which may also be referred to as a search execution component, can be implemented using program code that can be executed on a computing device. In some implementations, one set of program code implements both the search head 1362 and the search peer 1364 such that the search head 1362 and the search peer 1364 form one component. In some implementations, the search head 1362 is an independent piece of code that performs searching and no indexing functionality. In these implementations, the search head 1362 may be referred to as a dedicated search head.

The search head 1362 may consider multiple criteria when determining whether to send the query 1366 to the particular search peer 1364. For example, the search system 1360 may be configured to include multiple search peers that each have duplicative copies of at least some of the event data and are implanted using different hardware resources q. In this example, the sending the search query 1366 to more than one search peer allows the search system 1360 to distribute the search workload across different hardware resources. As another example, search system 1360 may include different search peers for different purposes (e.g., one has an index storing a first type of data or from a first data source while a second has an index storing a second type of data or from a second data source). In this example, the search query 1366 may specify which indexes to search, and the search head 1362 will send the query 1366 to the search peers that have those indexes.

To identify events 1378 to send back to the search head 1362, the search peer 1364 performs a map process 1370 to obtain event data 1374 from the index 1338 that is maintained by the search peer 1364. During a first phase of the map process 1370, the search peer 1364 identifies buckets that have events that are described by the time indicator in the search query 1366. As noted above, a bucket contains events whose timestamps fall within a particular range of time. For each bucket 1344 whose events can be described by the time indicator, during a second phase of the map process 1370, the search peer 1364 performs a keyword search 1374 using search terms specified in the search query 1366. The search terms can be one or more of keywords, phrases, fields, Boolean expressions, and/or comparison expressions that in combination describe events being searched for. When segmentation is enabled at index time, the search peer 1364 performs the keyword search 1372 on the bucket's index file 1346. As noted previously, the index file 1346 includes a lexicon of the searchable terms in the events stored in the bucket's raw data 1348 file. The keyword search 1372 searches the lexicon for searchable terms that correspond to one or more of the search terms in the query 1366. As also noted above, the lexicon incudes, for each searchable term, a reference to each location in the raw data 1348 file where the searchable term can be found. Thus, when the keyword search identifies a searchable term in the index file 1346 that matches a search term in the query 1366, the search peer 1364 can use the location references to extract from the raw data 1348 file the event data 1374 for each event that include the searchable term.

In cases where segmentation was disabled at index time, the search peer 1364 performs the keyword search 1372 directly on the raw data 1348 file. To search the raw data 1348, the search peer 1364 may identify searchable segments in events in a similar manner as when the data was indexed. Thus, depending on how the search peer 1364 is configured, the search peer 1364 may look at event fields and/or parts of event fields to determine whether an event matches the query 1366. Any matching events can be added to the event data 1374 read from the raw data 1348 file. The search peer 1364 can further be configured to enable segmentation at search time, so that searching of the index 1338 causes the search peer 1364 to build a lexicon in the index file 1346.

The event data 1374 obtained from the raw data 1348 file includes the full text of each event found by the keyword search 1372. During a third phase of the map process 1370, the search peer 1364 performs event processing 1376 on the event data 1374, with the steps performed being determined by the configuration of the search peer 1364 and/or commands in the search query 1366. For example, the search peer 1364 can be configured to perform field discovery and field extraction. Field discovery is a process by which the search peer 1364 identifies and extracts key-value pairs from the events in the event data 1374. The search peer 1364 can, for example, be configured to automatically extract the first 100 fields (or another number of fields) in the event data 1374 that can be identified as key-value pairs. As another example, the search peer 1364 can extract any fields explicitly mentioned in the search query 1366. The search peer 1364 can, alternatively or additionally, be configured with particular field extractions to perform.

Other examples of steps that can be performed during event processing 1376 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 1364 sends processed events 1378 to the search head 1362, which performs a reduce process 1380. The reduce process 1380 potentially receives events from multiple search peers and performs various results processing 1382 steps on the received events. The results processing 1382 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 1382 can further include applying commands from the search query 1366 to the events. The query 1366 can include, for example, commands for evaluating and/or manipulating fields (e.g., to generate new fields from existing fields or parse fields that have more than one value). As another example, the query 1366 can include commands for calculating statistics over the events, such as counts of the occurrences of fields, or sums, averages, ranges, and so on, of field values. As another example, the query 1366 can include commands for generating statistical values for purposes of generating charts of graphs of the events.

The reduce process 1380 outputs the events found by the search query 1366, as well as information about the events. The search head 1362 transmits the events and the information about the events as search results 1368, which are received by the search and reporting app 1316. The search and reporting app 1316 can generate visual interfaces for viewing the search results 1368. The search and reporting app 1316 can, for example, output visual interfaces for the network access application 1306 running on a computing device 1304 to generate.

The visual interfaces can include various visualizations of the search results 1368, such as tables, line or area charts, Chloropleth maps, or single values. The search and reporting app 1316 can organize the visualizations into a dashboard, where the dashboard includes a panel for each visualization. A dashboard can thus include, for example, a panel listing the raw event data for the events in the search results 1368, a panel listing fields extracted at index time and/or found through field discovery along with statistics for those fields, and/or a timeline chart indicating how many events occurred at specific points in time (as indicated by the timestamps associated with each event). In various implementations, the search and reporting app 1316 can provide one or more default dashboards. Alternatively or additionally, the search and reporting app 1316 can include functionality that enables a user to configure custom dashboards.

The search and reporting app 1316 can also enable further investigation into the events in the search results 1316. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 1366. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 14:
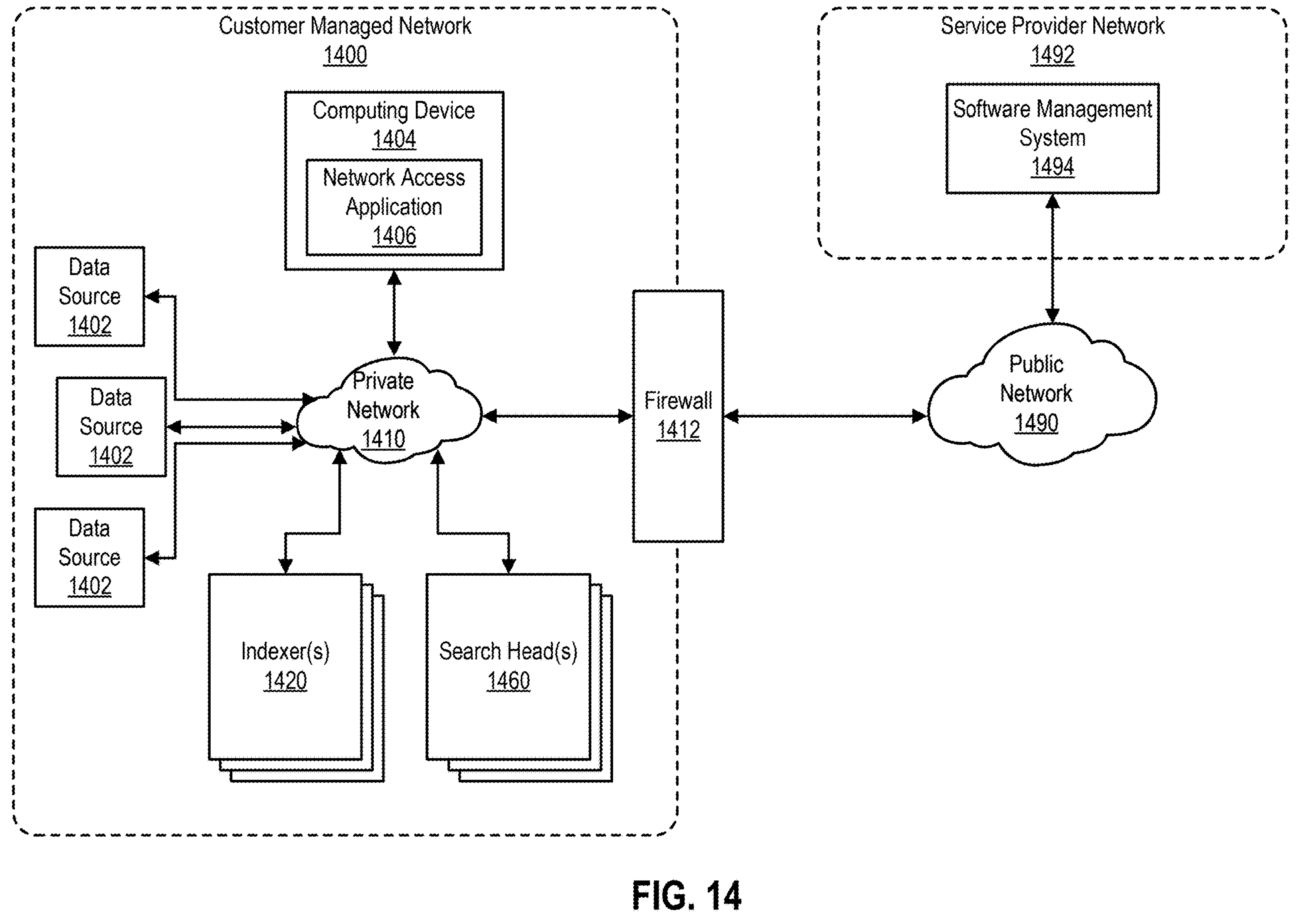
FIG. 14 illustrates an example of a self-managed network that includes a data intake and query system.

FIG. 14 illustrates an example of a self-managed network 1400 that includes a data intake and query system. "Self-managed" in this instance means that the entity that is operating the self-managed network 1400 configures, administers, maintains, and/or operates the data intake and query system using its own compute resources and people. Further, the self-managed network 1400 of this example is part of the entity's on-premise network and comprises a set of compute, memory, and networking resources that are located, for example, within the confines of a entity's data center. These resources can include software and hardware resources. The entity can, for example, be a company or enterprise, a school, government entity, or other entity. Since the self-managed network 1400 is located within the customer's on-prem environment, such as in the entity's data center, the operation and management of the self-managed network 1400, including of the resources in the self-managed network 1400, is under the control of the entity. For example, administrative personnel of the entity have complete access to and control over the configuration, management, and security of the self-managed network 1400 and its resources.

The self-managed network 1400 can execute one or more instances of the data intake and query system. An instance of the data intake and query system may be executed by one or more computing devices that are part of the self-managed network 1400. A data intake and query system instance can comprise an indexing system and a search system, where the indexing system includes one or more indexers 1420 and the search system includes one or more search heads 1460.

As depicted in FIG. 14, the self-managed network 1400 can include one or more data sources 1402. Data received from these data sources may be processed by an instance of the data intake and query system within self-managed network 1400. The data sources 1402 and the data intake and query system instance can be communicatively coupled to each other via a private network 1410.

Users associated with the entity can interact with and avail themselves of the functions performed by a data intake and query system instance using computing devices. As depicted in FIG. 14, a computing device 1404 can execute a network access application 1406 (e.g., a web browser), that can communicate with the data intake and query system instance and with data sources 1402 via the private network 1410. Using the computing device 1404, a user can perform various operations with respect to the data intake and query system, such as management and administration of the data intake and query system, generation of knowledge objects, and other functions. Results generated from processing performed by the data intake and query system instance may be communicated to the computing device 1404 and output to the user via an output system (e.g., a screen) of the computing device 1404.

The self-managed network 1400 can also be connected to other networks that are outside the entity's on-premise environment/network, such as networks outside the entity's data center. Connectivity to these other external networks is controlled and regulated through one or more layers of security provided by the self-managed network 1400. One or more of these security layers can be implemented using firewalls 1412. The firewalls 1412 form a layer of security around the self-managed network 1400 and regulate the transmission of traffic from the self-managed network 1400 to the other networks and from these other networks to the self-managed network 1400.

Networks external to the self-managed network can include various types of networks including public networks 1490, other private networks, and/or cloud networks provided by one or more cloud service providers. An example of a public network 1490 is the Internet. In the example depicted in FIG. 14, the self-managed network 1400 is connected to a service provider network 1492 provided by a cloud service provider via the public network 1490.

In some implementations, resources provided by a cloud service provider may be used to facilitate the configuration and management of resources within the self-managed network 1400. For example, configuration and management of a data intake and query system instance in the self-managed network 1400 may be facilitated by a software management system 1494 operating in the service provider network 1492. There are various ways in which the software management system 1494 can facilitate the configuration and management of a data intake and query system instance within the self-managed network 1400. As one example, the software management system 1494 may facilitate the download of software including software updates for the data intake and query system. In this example, the software management system 1494 may store information indicative of the versions of the various data intake and query system instances present in the self-managed network 1400. When a software patch or upgrade is available for an instance, the software management system 1494 may inform the self-managed network 1400 of the patch or upgrade. This can be done via messages communicated from the software management system 1494 to the self-managed network 1400.

The software management system 1494 may also provide simplified ways for the patches and/or upgrades to be downloaded and applied to the self-managed network 1400. For example, a message communicated from the software management system 1494 to the self-managed network 1400 regarding a software upgrade may include a Uniform Resource Identifier (URI) that can be used by a system administrator of the self-managed network 1400 to download the upgrade to the self-managed network 1400. In this manner, management resources provided by a cloud service provider using the service provider network 1492 and which are located outside the self-managed network 1400 can be used to facilitate the configuration and management of one or more resources within the entity's on-prem environment. In some implementations, the download of the upgrades and patches may be automated, whereby the software management system 1494 is authorized to, upon determining that a patch is applicable to a data intake and query system instance inside the self-managed network 1400, automatically communicate the upgrade or patch to self-managed network 1400 and cause it to be installed within self-managed network 1400.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A method comprising:

obtaining a data packet comprising personal identifiable information (PII) acquired by a production environment of a software application, wherein the data packet is labeled with one or more data tags comprising at least one of a region tag, a source type tag, or a company tag;

transforming the PII to produce de-identified data corresponding to the PII by applying one or more of a central de-identification policy or a region specific de-identification policy to the PII; and enabling, by a computer system, access to the de-identified data corresponding to the PII by a development environment of the software application while preventing access to the PII by the development environment of the software application by applying role-based access control to the de-identified data, wherein:

the enabling access to the de-identified data and the preventing access to the PII collectively comprise applying a de-identification policy to the PII to produce the de-identified data, and applying the role-based access control to control access by a plurality of software development users to the de-identified data; and the applying the de-identification policy comprises automatically selecting a region-specific de-identification policy, of a plurality of region-specific de-identification policies, for use in de-identifying the PII, wherein the plurality of region-specific de-identification policies comprise de-identification policies for a plurality of different geographic regions corresponding respectively to a plurality of different political entities; and the selecting the region-specific de-identification policy is based on a region identifier contained in a received data packet that contains the PII.

2. The method as recited in claim 1, wherein the transforming is performed in response to a request for data containing the PII from a user of the development environment of the software application.

3. The method as recited in claim 1, wherein the transforming is performed in the production environment of the software application upon acquisition of data containing the PII by the production environment of the software application, prior to any request for the data containing the PII from the development environment of the software application.

4. The method as recited in claim 1, wherein the transforming is performed in the production environment of the software application upon acquisition of data containing the PII by the production environment of the software application, prior to any request for the data containing the PII from the development environment of the software application, and wherein the transforming comprises updating a lookup table with a key that maps the de-identified data to the PII.

5. The method as recited in claim 1, wherein the transforming is performed in the development environment of the software application, prior to any request for the data containing the PII from a user of the development environment.

6. The method as recited in claim 1, further comprising:

enabling a user of the development environment to use the de-identified data to train one or more machine learning models associated with the software application.

7. The method as recited in claim 1, wherein the software application is a cybersecurity application.

8. The method as recited in claim 1, wherein the de-identification policy and role-based access control are applied in the development environment.

9. The method as recited in claim 1, wherein the role-based access control is based on a source type identifier in the data packet.

10. The method as recited in claim 1, further comprising:

generating, by a computer system, a user interface that enables a user to specify and update a plurality of data de-identification policies, including a separate data de-identification policy, to be applied by a computer system, for ingested data associated with each of a plurality of geographic regions, the plurality of geographic regions corresponding respectively to a plurality of different political entities that have different data privacy laws.

11. The method as recited in claim 1, further comprising:

generating, by a computer system, a user interface that enables a user to specify and update a plurality of data de-identification policies, including a separate data de-identification policy, to be applied by a computer system, for ingested data associated with each of a plurality of geographic regions, the plurality of geographic regions corresponding respectively to a plurality of different political entities that have different data privacy laws;

ingesting, into the computer system, a plurality of data elements, each containing at least a portion of the PII; and determining, by the computer system, a geographic region associated with each of the data elements;

wherein the transforming the PII to produce de-identified data includes automatically identifying a de-identification policy to use for each of the data elements, based on the associated geographic region.

12. The method as recited in claim 1, further comprising:

ingesting, into the computer system, a data element containing PII;

in response to the ingesting of the data element, performing said transforming, including applying a de-identification policy to the data element, and storing a plurality of versions of the data element, each version representing the data element after a different level of PII de-identification has been performed;

receiving, from a user, a request for access to the data element;

determining a level of access associated with the user; and selecting one of the stored plurality of versions of the data element to be provided to the user, based on the level of access associated with the user.

13. The method as recited in claim 1, further comprising:

receiving, from a user, a request for access to a stored data element that includes PII;

determining a level of access associated with the user; and in response to the request for access to the stored data element, selecting one of a plurality of de-identification policies to be applied to the data element based on the level of access associated with the user, each of the plurality of de-identification policies corresponding to a different level of PII de-identification;

retrieving the stored data element;

applying the selected de-identification policy to the data element to produce a modified data element; and providing the modified data element to the user.

14. A non-transitory computer-readable medium having stored therein instructions, execution of which by at least one processor in a processing system causes the processing system to perform operations including:

obtaining a data packet comprising personal identifiable information (PII) acquired by a production environment of a software application, wherein the data packet is labeled with one or more data tags comprising at least one of a region tag, a source type tag, or a company tag;

transforming the PII to produce de-identified data corresponding to the PII by applying one or more of a central de-identification policy or a region specific de-identification policy to the PII; and enabling, by a computer system, access to the de-identified data corresponding to the PII by a development environment of the software application while preventing access to the PII by the development environment of the software application by applying role-based access control to the de-identified data, wherein:

the enabling access to the de-identified data and the preventing access to the PII collectively comprise applying a de-identification policy to the PII to produce the de-identified data, and applying the role-based access control to control access by a plurality of software development users to the de-identified data; and the applying the de-identification policy comprises automatically selecting a region-specific de-identification policy, of a plurality of region-specific de-identification policies, for use in de-identifying the PII, wherein the plurality of region-specific de-identification policies comprise de-identification policies for a plurality of different geographic regions corresponding respectively to a plurality of different political entities; and the selecting the region-specific de-identification policy is based on a region identifier contained in a received data packet that contains the PII.

15. The at least one non-transitory computer-readable medium as recited in claim 14, such that the transforming is performed in response to a request for data containing the PII from a user of the development environment of the software application.

16. The at least one non-transitory computer-readable medium as recited in claim 14, such that the transforming is performed in the production environment of the software application upon acquisition of data containing the PII by the production environment of the software application, prior to any request for the data containing the PII from the development environment of the software application.

17. A computer system comprising:

at least one processor; and at least one non-transitory computer-readable storage medium having stored thereon instructions, execution of which by the at least one processor causes the computer system to perform operations including:

obtaining a data packet comprising personal identifiable information (PII) acquired by a production environment of a software application, wherein the data packet is labeled with one or more data tags comprising at least one of a region tag, a source type tag, or a company tag;

transforming the PII to produce de-identified data corresponding to the PII by applying one or more of a central de-identification policy or a region specific de-identification policy to the PII; and enabling, by a computer system, access to the de-identified data corresponding to the PII by a development environment of the software application while preventing access to the PII by the development environment of the software application by applying role-based access control to the de-identified data, wherein:

the enabling access to the de-identified data and the preventing access to the PII collectively comprise applying a de-identification policy to the PII to produce the de-identified data, and applying the role-based access control to control access by a plurality of software development users to the de-identified data; and the applying the de-identification policy comprises automatically selecting a region-specific de-identification policy, of a plurality of region-specific de-identification policies, for use in de-identifying the PII, wherein the plurality of region-specific de-identification policies comprise de-identification policies for a plurality of different geographic regions corresponding respectively to a plurality of different political entities; and the selecting the region-specific de-identification policy is based on a region identifier contained in a received data packet that contains the PII.

* * * * *